United States Patent
Wares et al.

(10) Patent No.: US 11,005,416 B2
(45) Date of Patent: *May 11, 2021

(54) PHOTOVOLTAIC PANEL

(71) Applicant: SunPower Corporation, San Jose, CA (US)

(72) Inventors: Brian Wares, Jenner, CA (US); David C. Okawa, Redwood City, CA (US); Tamir Lance, Los Gatos, CA (US)

(73) Assignee: SunPower Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/741,586

(22) Filed: Jan. 13, 2020

(65) Prior Publication Data
US 2020/0153384 A1    May 14, 2020

Related U.S. Application Data

(63) Continuation of application No. 16/010,231, filed on Jun. 15, 2018, now Pat. No. 10,581,372.

(51) Int. Cl.
*H02S 30/20* (2014.01)
*F24S 25/67* (2018.01)
(Continued)

(52) U.S. Cl.
CPC .............. *H02S 30/20* (2014.12); *F24S 25/20* (2018.05); *F24S 25/67* (2018.05); *H02S 20/23* (2014.12);
(Continued)

(58) Field of Classification Search
CPC .......... H02S 30/10; H02S 20/23; H02S 40/34; H02S 30/20; Y02B 10/12; F24S 25/67;
(Continued)

(56) References Cited

U.S. PATENT DOCUMENTS 4,713,492 A    12/1987    Hanak
5,474,620 A    12/1995    Nath et al.
(Continued)

FOREIGN PATENT DOCUMENTS

DE    212012000175    5/2014
EP    2863443    4/2015
(Continued)

OTHER PUBLICATIONS

Portable solar panel kits, small to large solar power kits—Goal Zero, https://web.archive.org/web/20170507213353/http://www.goalzero.com:80/solar-kits, May 7, 2017, 2 pags.
(Continued)

*Primary Examiner* — Jessie T Fonseca
(74) *Attorney, Agent, or Firm* — Schwabe, Williamson & Wyatt, P.C.

(57) ABSTRACT

Modular photovoltaic (PV) panel, system, and method of mounting. The system including a mounting flashing configured to mounted to a mounting surface and a folding PV panel. The folding PV panel including: a first subpanel including first PV cells, wherein the first subpanel extends along a first lateral plane and comprises a plurality of mounting hooks extending laterally from and affixed to a backside of the first subpanel, the mounting hooks configured to couple to the mounting flashing; a second subpanel including second PV cells, wherein the second subpanel extends along a second lateral plane, wherein the second subpanel comprises a front edge support configured to hold a front edge of the second subpanel away from the mounting surface; and a hinge assembly rotationally coupling the first subpanel and the second subpanel to allow an angle between the first lateral plane and the second lateral plane to change.

20 Claims, 50 Drawing Sheets

(51) Int. Cl.
*H02S 30/10* (2014.01)
*H02S 20/23* (2014.01)
*H02S 40/34* (2014.01)
*H02S 40/32* (2014.01)
*F24S 25/20* (2018.01)

(52) U.S. Cl.
CPC .............. *H02S 30/10* (2014.12); *H02S 40/32* (2014.12); *H02S 40/34* (2014.12)

(58) Field of Classification Search
CPC . F24S 25/20; F24S 25/70; F24J 2/5211; F24J 2002/5213
See application file for complete search history.

(56) References Cited

U.S. PATENT DOCUMENTS

| | | | |
|---|---|---|---|
| 5,520,747 | A | 5/1996 | Marks |
| 5,582,653 | A | 12/1996 | Kataoka et al. |
| 6,331,673 | B1 | 12/2001 | Kataoya et al. |
| 6,536,729 | B1 | 3/2003 | Haddock |
| 6,553,729 | B1 | 4/2003 | Nath et al. |
| 7,531,740 | B2 | 5/2009 | Flaherty et al. |
| 7,557,291 | B2 | 7/2009 | Flaherty et al. |
| 7,718,923 | B1 | 5/2010 | Hansen et al. |
| 7,812,247 | B2 | 10/2010 | Armstrong et al. |
| 7,829,783 | B2 | 11/2010 | Krajewski et al. |
| 7,902,301 | B2 | 3/2011 | Kempe et al. |
| 8,215,070 | B2 | 7/2012 | Railkar et al. |
| 8,276,329 | B2 | 10/2012 | Lenox |
| 8,448,407 | B1 | 5/2013 | Wiener |
| 8,512,866 | B2 | 8/2013 | Taylor |
| 8,647,009 | B2 | 2/2014 | Kobayashi |
| 8,895,835 | B2 | 11/2014 | Chaney |
| 9,018,513 | B2 | 4/2015 | Croft et al. |
| D755,119 | S | 5/2016 | Munshi et al. |
| 9,512,618 | B2 | 12/2016 | Lang et al. |
| D778,234 | S | 2/2017 | Cheung et al. |
| 9,590,123 | B2 | 3/2017 | Hood |
| 9,780,719 | B2 | 10/2017 | Atchley et al. |
| 9,853,594 | B2 | 12/2017 | Almy |
| 2003/0127125 | A1 | 7/2003 | Yeh |
| 2005/0178428 | A1 | 8/2005 | Laaly et al. |
| 2005/0284515 | A1 | 12/2005 | Stevens et al. |
| 2006/0201545 | A1 | 9/2006 | Ovshinsky et al. |
| 2007/0074755 | A1 | 4/2007 | Eberspacher et al. |
| 2008/0314434 | A1 | 12/2008 | Khouri et al. |
| 2009/0014058 | A1 | 1/2009 | Croft et al. |
| 2009/0178703 | A1 | 7/2009 | Gumm |
| 2009/0320898 | A1 | 12/2009 | Gumm |
| 2010/0000165 | A1 | 1/2010 | Koller |
| 2010/0031997 | A1 | 2/2010 | Basol |
| 2010/0101634 | A1 | 4/2010 | Frank et al. |
| 2010/0108120 | A1 | 5/2010 | Lin et al. |
| 2010/0156339 | A1 | 6/2010 | Hoffman |
| 2011/0036390 | A1 | 2/2011 | Nelson et al. |
| 2011/0139224 | A1 | 6/2011 | Krajewski |
| 2011/0203637 | A1 | 8/2011 | Patton et al. |
| 2011/0203639 | A1 | 8/2011 | Elliott et al. |
| 2011/0253193 | A1 | 10/2011 | Korman et al. |
| 2011/0277748 | A1 | 11/2011 | Chu |
| 2012/0152349 | A1 | 6/2012 | Cao et al. |
| 2012/0240982 | A1 | 9/2012 | Corneille |
| 2013/0067836 | A1 | 3/2013 | Sherman |
| 2013/0160823 | A1 | 6/2013 | Khouri et al. |
| 2013/0160824 | A1 | 6/2013 | Khouri et al. |
| 2014/0000186 | A1 | 1/2014 | Yen |
| 2014/0305495 | A1 | 10/2014 | Krajewski |
| 2015/0075583 | A1 | 3/2015 | Francis et al. |
| 2015/0263182 | A1 | 9/2015 | Vornbrock et al. |
| 2015/0326172 | A1 | 11/2015 | Koehler |
| 2016/0254404 | A1 | 9/2016 | Dries et al. |
| 2016/0285406 | A1 | 9/2016 | Nishio et al. |
| 2016/0359451 | A1 | 12/2016 | Mao et al. |
| 2016/0365829 | A1 | 12/2016 | Pizzarello et al. |
| 2017/0070188 | A1 | 3/2017 | Meyer et al. |

FOREIGN PATENT DOCUMENTS

| | | |
|---|---|---|
| EP | 3159937 | 4/2017 |
| FR | 2934418 | 1/2010 |
| JP | 2014047528 A | 3/2014 |
| WO | WO 2008/027190 | 3/2008 |
| WO | WO 2013/042081 | 3/2013 |

OTHER PUBLICATIONS

Portable Solar Panels, Nomad & Boulder Solar Panels—Goal Zero, https://web.archive.org/web/20170507230105/http://www.goalzero.com:80/solar-panels, May 7, 2017, 2 pgs.

Portable Solar Battery Charger—Portable Solar Panels—Off-Grid Solar Generators—Goal Zero—Extreme Portable Power, https://web.archive.org/web/20170507202720/http://www.goalzero.com:80/, May 7, 2017, 1 pg.

International Search Report and Written Opinion from PCT/US2019/033721 dated Sep. 23, 2019, 10 pgs.

Non-Final Office Action from U.S. Appl. No. 16/010,231 dated Jun. 27, 2019, 11 pgs.

International Preliminary Report on Patentability from PCT/US2019/033721 dated Dec. 24, 2020, 7 pgs.

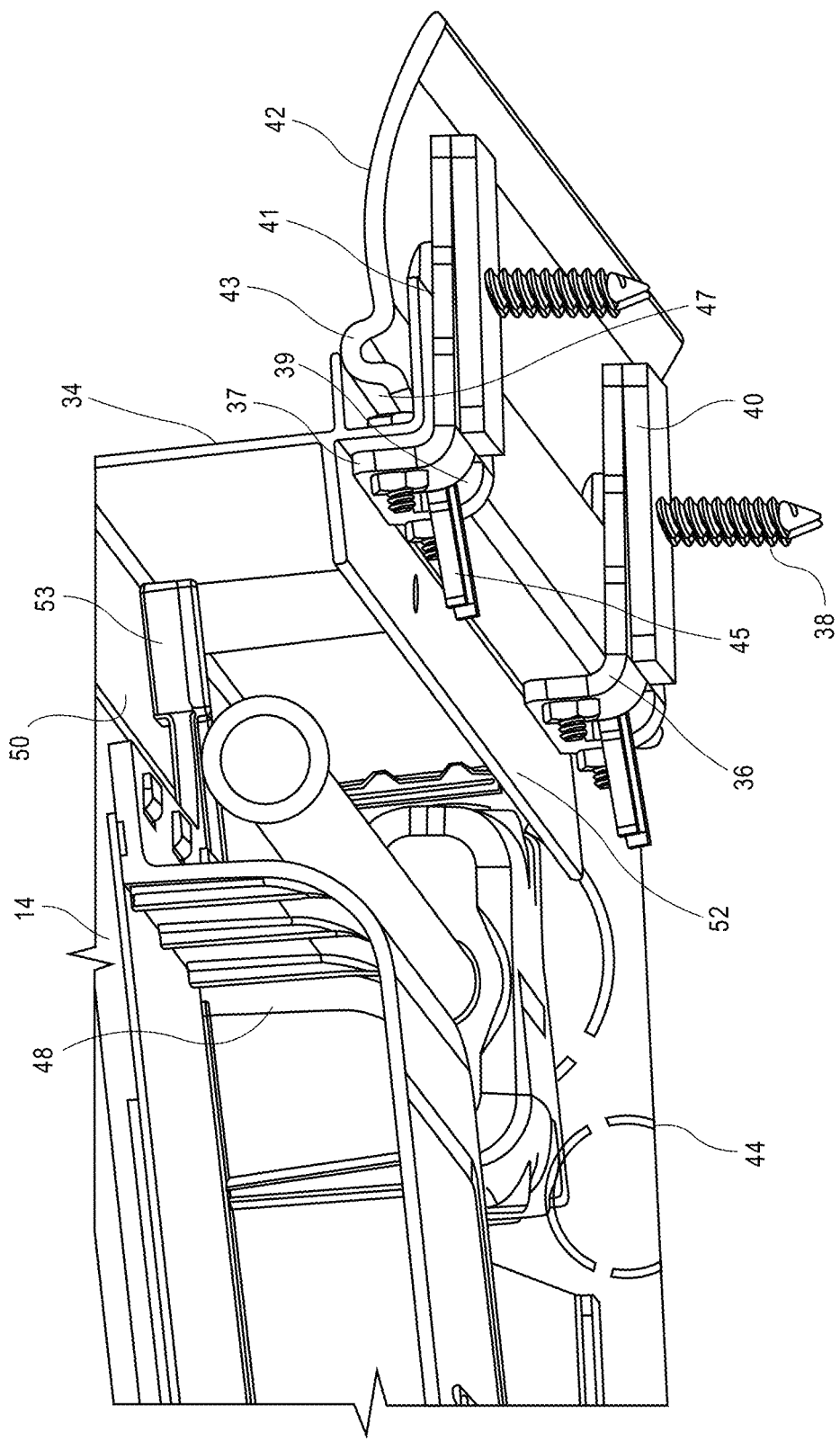

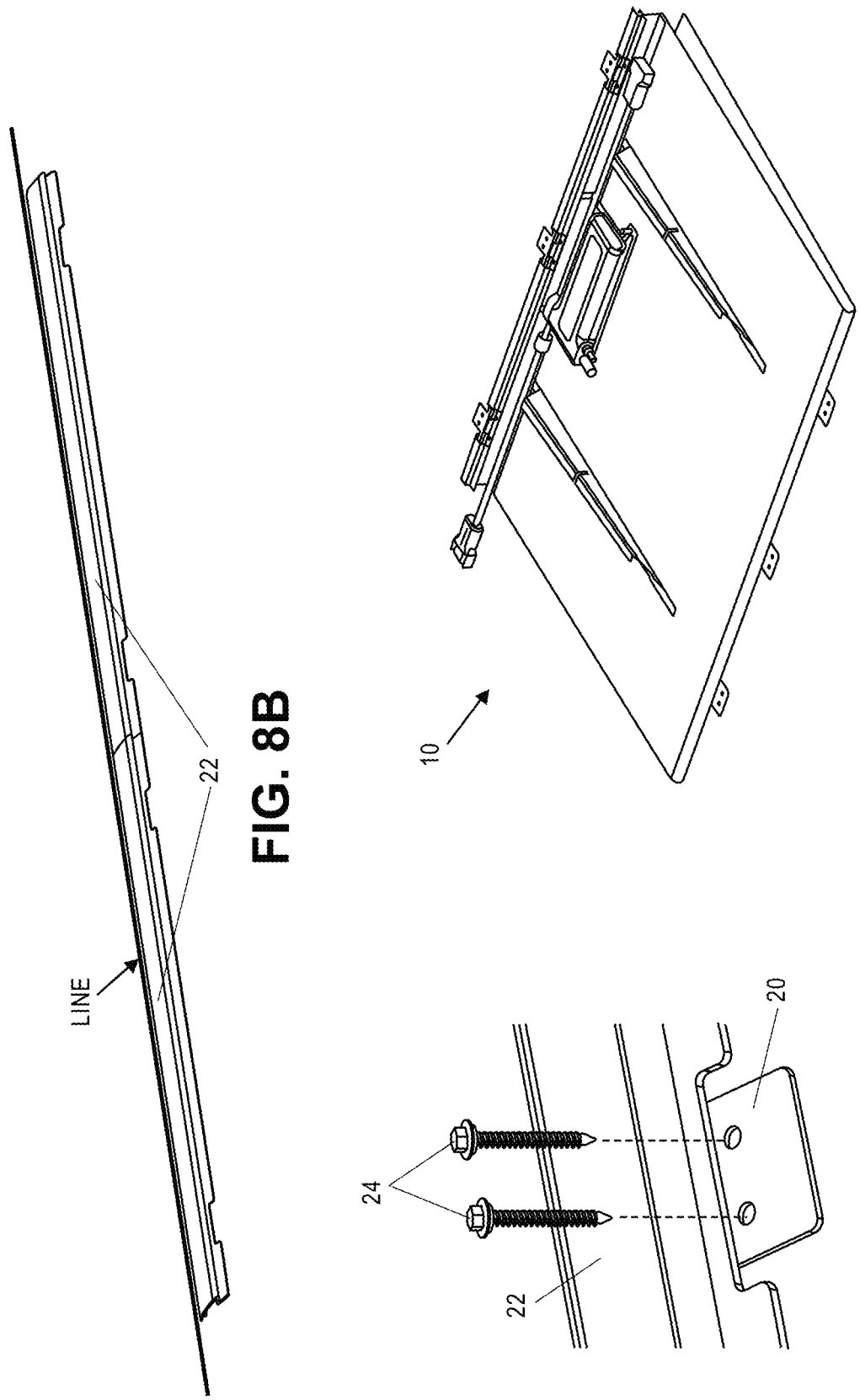

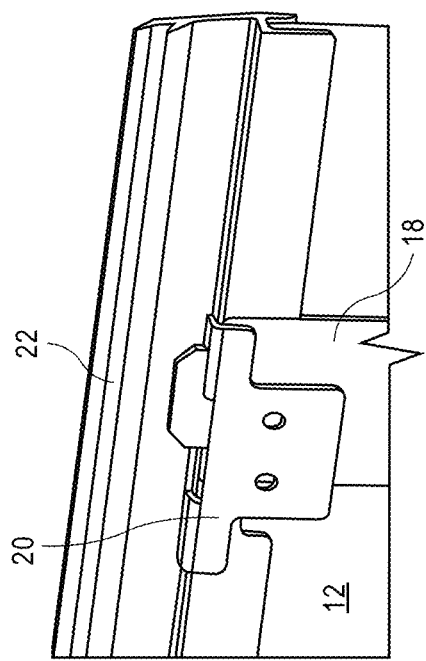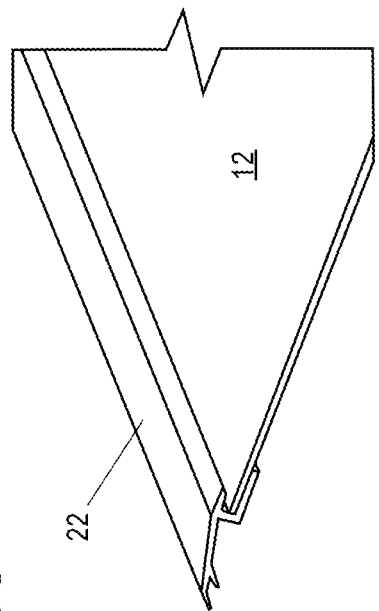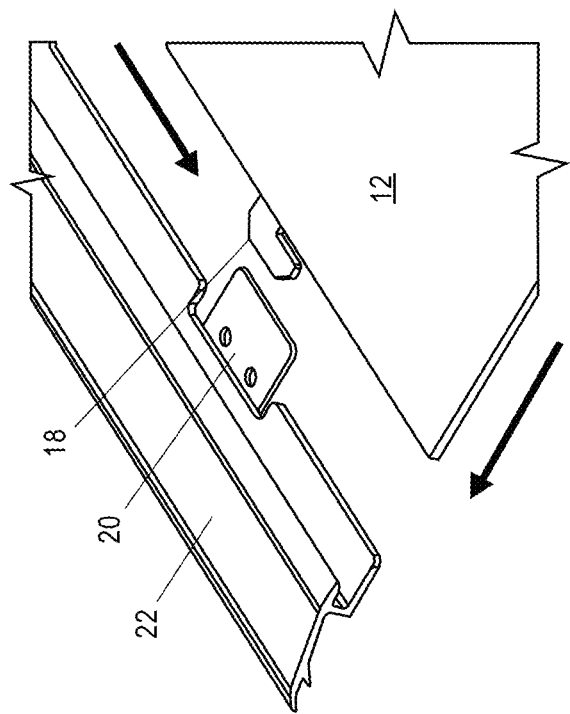

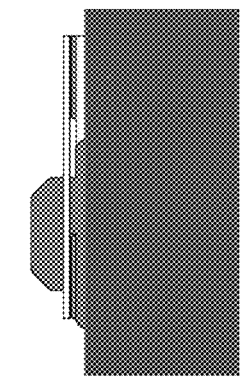
FIG. 45
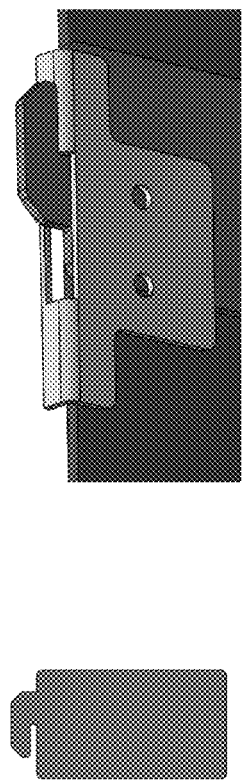
FIG. 44
FIG. 43
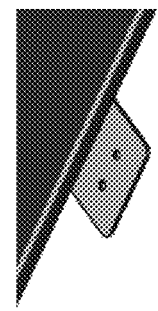
FIG. 49
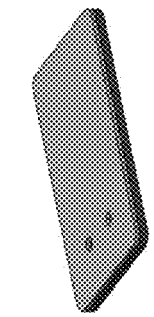
FIG. 48
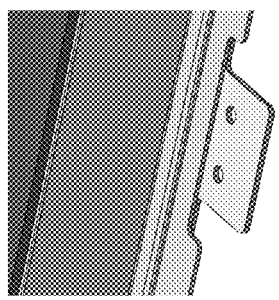
FIG. 47
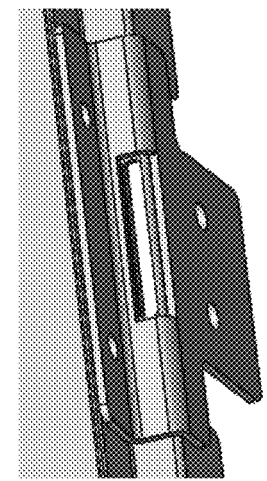
FIG. 46

PHOTOVOLTAIC PANEL

CROSS-REFERENCE TO RELATED APPLICATIONS

This application is a continuation of U.S. patent application Ser. No. 16/010,231, filed on Jun. 15, 2018, issued as U.S. Pat. No. 10,581,372, the entire contents of which are hereby incorporated by reference herein.

TECHNICAL FIELD

This disclosure relates generally to the field of photovoltaic (PV) panels. More particular, this disclosure relates to the installation of photovoltaic PV panels on a surface.

BACKGROUND

Photovoltaic (PV) cells, commonly known as solar cells, are well known devices for converting solar radiation into electrical energy. Generally, solar cells are fabricated on a semiconductor wafer or substrate using semiconductor processing techniques to form a p-n junction near a surface of the substrate. Solar radiation impinging on the surface of the substrate creates electron and hole pairs in the bulk of the substrate, which migrate to p-doped and n-doped regions in the substrate, thereby generating a voltage differential between the doped regions. The doped regions are coupled to metal contacts on the solar cell to direct an electrical current from the cell to an external circuit coupled thereto. Generally, an array of solar cells, each solar cell interconnected, is mounted on a common or shared platform to provide a PV panel. The PV panel can be mounted on a frame to provide a PV module. Several PV modules or module groups may be electrically coupled to an electrical power distribution network to form a PV system.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

FIG. 7A is a close up isometric cross-sectional view of a front end portion of the folding PV panel system of FIG. 1, in accordance with embodiments of the present disclosure.

FIG. 7A is a close up isometric cross-sectional view of a front end portion of the folding PV panel system of FIG. 1, in accordance with embodiments of the present disclosure.

FIG. 8A is an isometric view illustrating a folding photovoltaic (PV) panel system in a folded configuration, in accordance with embodiments of the present disclosure.

FIG. 8B is an isometric view illustrating the installation of a rear mounting flashing, in accordance with embodiments of the present disclosure.

FIG. 8C is a close up isometric view illustrating the installation of a rear mounting flashing, in accordance with embodiments of the present disclosure.

FIGS. 9A-9C illustrate the mounting of a folding PV panel to a rear mounting flashing, in accordance with embodiments of the present disclosure.

DETAILED DESCRIPTION OF DISCLOSED EMBODIMENTS

Figure 1:
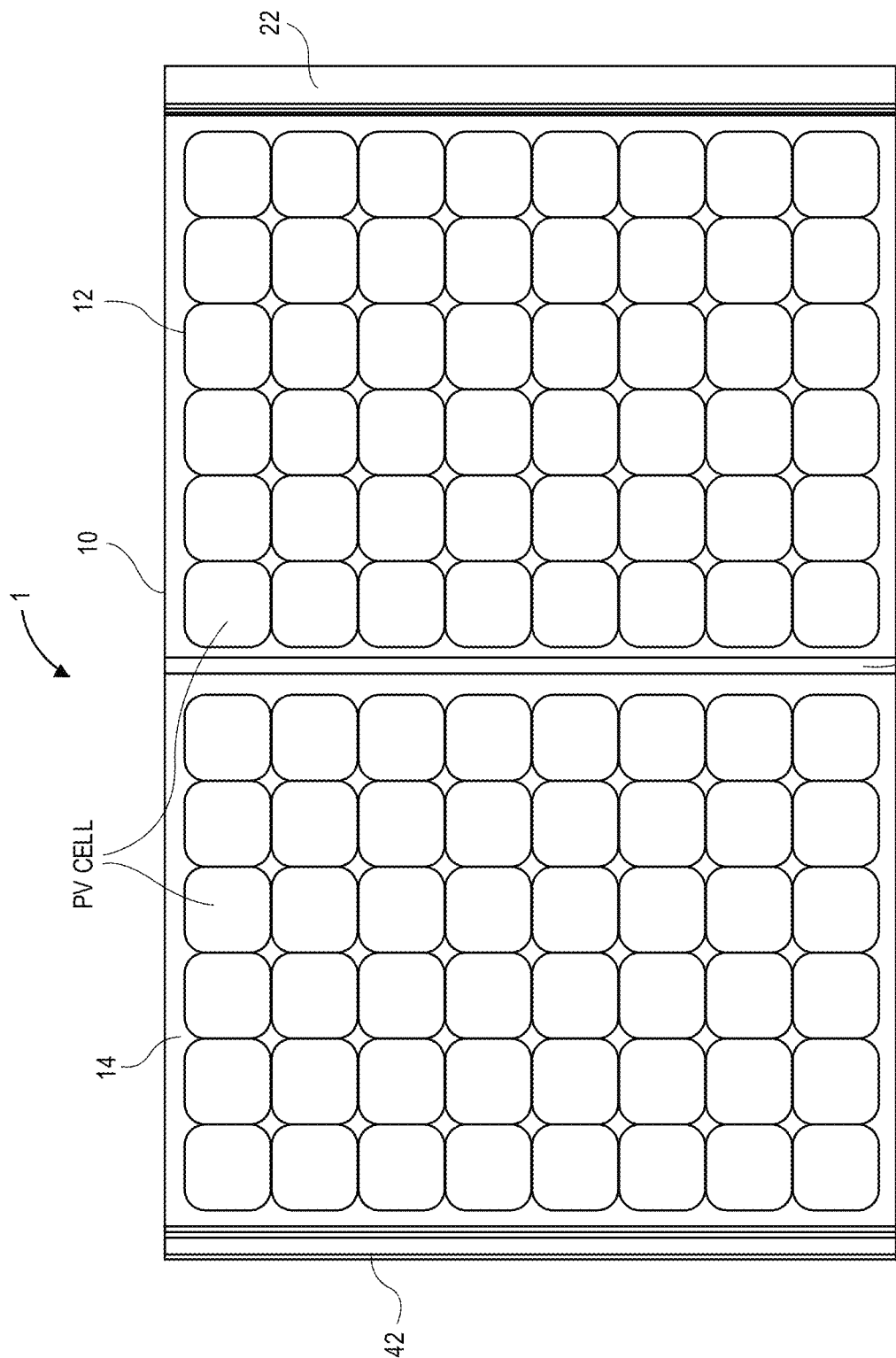
FIG. 1 is a top view illustrating a folding photovoltaic (PV) panel system in an extended, unfolded position, in accordance with embodiments of the present disclosure.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" subpanel does not necessarily imply that this subpanel is the first subpanel in a sequence; instead the term "first" is used to differentiate this subpanel from another subpanel (e.g., a "second" subpanel).

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

In addition, certain terminology may also be used in the following description for the purpose of reference only, and thus are not intended to be limiting. For example, terms such as "upper," "lower," "above," "below," "in front of," and "behind" refer to directions in the drawings to which reference is made. Terms such as "front," "back," "rear," "side," "outboard," "inboard," "leftward," and "rightward" describe the orientation and/or location of portions of a component, or describe the relative orientation and/or location between components, within a consistent but arbitrary frame of reference which is made clear by reference to the text and the associated drawings describing the component(s) under discussion. Such terminology may include the words specifically mentioned above, derivatives thereof, and words of similar import.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

Logistics, shipping, and labor costs involved in rooftop installation of existing photovoltaic (PV) modules are expensive. Conventional PV modules can be formed as a PV laminate surrounded by a continuous frame around all edges of the PV laminate. The frames and panels of existing PV modules are typically large and heavy, and thus, shipping the PV modules is expensive and handling the PV modules is cumbersome. In addition, logistics, shipping, transport, and installation of PV racking systems is expensive and time consuming. Removal or reduction of racking systems can substantially impact the cost and time to payback for PV systems. Disclosed herein are racking system free devices, systems and methods that allow for ease, esthetically pleasing, and cost effective mounting of PV cells to a surface, such as a the roof of a home or other structure.

Aspects of the present disclosure are drawn to systems, devices, and/or methods that employ a solar or PV panel, such as a folding PV panel that has two subpanels interconnected by one or more flexible regions (e.g., one or more hinges). Installation of one or more of the PV panels, such as folding PV panels, is accomplished with an integrated mounting system that further allows for the interconnection of multiple the PV panels in arrays without the need for addition hardware and only minimal installation training. In certain embodiments, the PV panel is a folding PV panel. With respect to folding PV panels, the subpanels of the folding PV panels can be folded into a stacked configuration for shipment, which can decrease shipping costs and make handling of the folded subpanels easier. The folded subpanels also enable easy transport of the panels from warehouses to job sites and from truck to roof. In some embodiments, the PV panel is a non-folding PV panel, for example a single rigid or semi-rigid panel. The PV panel can be lightweight and can be mounted directly on a roof. For example, direct roof attachment may be enabled by using mounting flashing, using the PV panel as an integrated housing, and placing a power converter (e.g. a microinverter) on a backside of the PV panel such that it resides within the integrated housing.

Referring to FIGS. 1-7B, aspects of a PV panel installation system 1 are shown in accordance with various embodiments of the present disclosure. With reference to FIG. 1, a PV panel installation system 1 includes a folding PV panel 10, an optional rear mounting flashing 22, and an optional front flashing 42. The rear mounting flashing 22 and/or the front flashing 42 can replace a conventional frame surrounding the periphery of a PV laminate in a conventional PV module. For example, the front flashing 42 can support a single side of a four-sided PV panel or subpanel such that the other three sides of the PV laminate or subpanel are unframed. Similarly, the rear flashing 22 can support a single side of a four-sided PV panel or subpanel (e.g. 12) such that the other three sides of the PV laminate or subpanel are unframed. In other words, the front flashing 42 and/or rear flashing 22 can provide a partially-frame PV-module, thereby reducing expense and complexity. The folding PV panel 10, can include a first or rear subpanel 12 and a second or front subpanel 14 interconnected by a hinge 16. FIG. 1 depicts a folding PV panel with a single contiguous hinge 16; however, multiple hinges, such as multiple discrete hinges are contemplated. Subpanels 12 and 14 may be made of materials with characteristics such as thickness and length and width appropriate to meet >40V, 600V, 1000V, or 1500V applications that may be grid tied. In one example, the width of a subpanel can be selected between 0.5-2.5 meters and the length of a subpanel can be selected to be 0.5-2.5 meters. The first subpanel 12 and the second subpanel 14 may have several PV cells arranged in an array to receive and convert sunlight into electrical energy (see, for example, FIG. 1). The array can include any number of rows and columns of PV cells. Furthermore, the folding PV panel can include any total number of PV cells, e.g., 50-150 total PV cells. For example, each of subpanels 12 and 14 of the folding PV panel depicted in FIG. 1 include six rows and eight columns of PV cells. In some embodiments, subpanels may comprise thin film solar cells which may not be provided as discrete or distinct solar cells.

The illustration of the cells of the first subpanel 12 and second subpanel 14 is not intended to be limiting—any subpanel described herein may include any type of cell (such as cells that are partially or wholly singulated and/or separated, for instance). In one example, monocrystalline, polycrystalline and/or any other type of silicon-based solar cell can be used. FIG. 1 depicts PV subpanels 12 and 14 comprising interdigitated back contact (IBC) solar cells, however front contact solar cells and/or shingled strips of solar cells can be employed. For example, shingled strips can be, e.g., cut from standard dimension silicon solar cells and joined together in an overlapping manner using conductive adhesive that connects strips to adjacent strips. In embodiments, each subpanel 12 and 14 of the folding PV panel 10 may include a front side facing the sun and a backside facing an installation site. For example, each PV subpanel 12 and 14 may include a front sheet facing upward toward the sun, and a back sheet facing downward toward a mounting surface, such as a roof of a building or other structure.

The front sheet and back sheet of the subpanels 12 and 14 may be planar. The front sheet and back sheet may be flexible, semi-rigid, rigid or a combination thereof. More particularly, each of the subpanels 12 and 14 may extend along a respective lateral plane. For example, the first PV subpanel 12 may extend along a first lateral plane, and the second PV subpanel 14 may extend along a second lateral plane. The lateral planes may be separated by an angle. For example, when the folding PV panel 10 is folded about the hinge 16, the angle between the subpanels 12 and 14 may change. By way of example, when the second subpanel 14 is folded upward about the hinge 16, the angle between the front sheet of the first subpanel 12 and the front sheet of the second subpanel 14 decreases. The hinge 16 permits the angle between the first lateral plane and the second lateral plane to change. Accordingly, each of the subpanels 12 and 14 in the folding PV panel 10 can be coupled to each other by a respective hinge 16, and the hinge 16 may be opened to spread the subpanels 12 and 14 for mounting (see, for example, FIGS. 8C, 10A and 10B), or the hinge 16 may be closed to stack the subpanels 12 and 14 for shipment and handling, see, for example, FIG. 8A.

The hinge 16 may interconnect the first subpanel 12 and the second subpanel 14. For example, the hinge 16 may have a first leaf connected to the first subpanel 12, and a second leaf connected to the second subpanel 14. The first leaf and the second leaf may move relative to each other via a flexible or rotatable coupler. By way of example, the hinge 16 may include a flexible strap, and the first leaf and the second leaf may be sections of the flexible strap. The flexible strap can be fabricated from a strip or film of flexible material, e.g., a fiber reinforced rubber, a composite film, etc. The hinge 16 can also be formed as part of a laminate during a lamination process or added afterwards. The hinge 16 can have insulators for the electrical components. The insulators can be laminated or mounted after the lamination process is complete.

The flexible strap can include a central portion integral to the first leaf and the second leaf. The first leaf, the second leaf, and the central portion may be sections of the flexible strap defined by their placement relative to the subpanels of the folding PV panel 10. The first leaf may be the section of the flexible strap mounted on the first subpanel 12, the second leaf may be the section of the flexible strap mounted on the second subpanel 14, and the central portion may be the section of the flexible strap that bridges a gap between the first subpanel 12 and the second subpanel 14. Each leaf of the hinge 16 can be attached to a respective subpanel using a mechanical, adhesive, or thermal bond. For example, the leaves may be fastened to the subpanels by screws, the leaves may be glued to the subpanels, or the leaves may be welded to the subpanels. Alternatively, the subpanels may be laminated top sheet on a flexible back sheet with laminated electrical conductors running across hinge between subpanels, rather than separate leafs connecting the hinge to the subpanels.

Electrical or electronic components may be mounted on the hinge 16. For example, an electrical conductor (e.g., a wire, a ribbon, or the like, or combinations thereof), may traverse a length and/or width of the hinge 16. The electrical conductor may be attached to the hinge, e.g., by being laminated onto the hinge 16 seam. The electrical conductor may provide a conductive return to transfer electrical power from the PV cell to a power converter (e.g. a microinverter) and/or a junction box. Other electrical or electronic components, may be mounted on the hinge 16, e.g., within the gap between the first subpanel 12 and the second subpanel 14. The hinge 16 may also have an encapsulant or another insulation to isolate and protect the ribbon from the environment. The electrical conductor and/or electronic components can run along or across the seam. For example, the electrical conductor may run in any direction (longitudinally through the gap, transversely across the gap, slanted across the gap, vertically through the hinge 16, etc.) across the hinge 16 to electrically interconnect a PV cell of the first subpanel 12 with a PV cell of the second subpanel 14. The electronic components can be disposed within the seam or outside of the seam to interconnect the respective panels. These and additional hinge embodiments may be found in International Application No. PCT/US18/32025, filed May 10, 2018, which is specifically incorporated herein by reference in its entirety.

While a folding type PV panel is depicted, it is envisioned that in some embodiments the PV panel can be composed of a single subpanel or panel, for example, solely what is referred to below as the second subpanel. In such embodiments, the first subpanel may be omitted or made rigid and/or continuous with the second subpanel. Alternatively, the joint between the first subpanel and the second subpanel may be flexible, for example, such that the two subpanels may flex when mounted such that the first lateral plane of the first subpanel and second lateral plane of the second subpanel may be separated by an angle.

As will become apparent one of the unique attributes of the disclosed systems, devices, and methods is that when viewed as installed the PV system is very clean with very few of the working components, other than the PV cells themselves, visible (see, for example FIG. 1). This design is not only sleek in appearance, but creates a functional system that is easy to transport and install with minimal training or installation time. This is accomplished at least in part by using the second subpanel 14 to create a housing for the electronic components of the folding PV panel 10 and using an innovative mounting and optionally an integrated flashing design.

With reference to FIGS. 2-7B, the folding PV panel 10 includes additional components mounted on the subpanels 12 and 14. For example, in some embodiments, accessory components (e.g. module-level power electronics, mounting features, etc.) are mounted on the backside of the second or lower subpanel 14 such that these accessory components are not visible from the front side for aesthetic purposes or otherwise.

Figure 2:
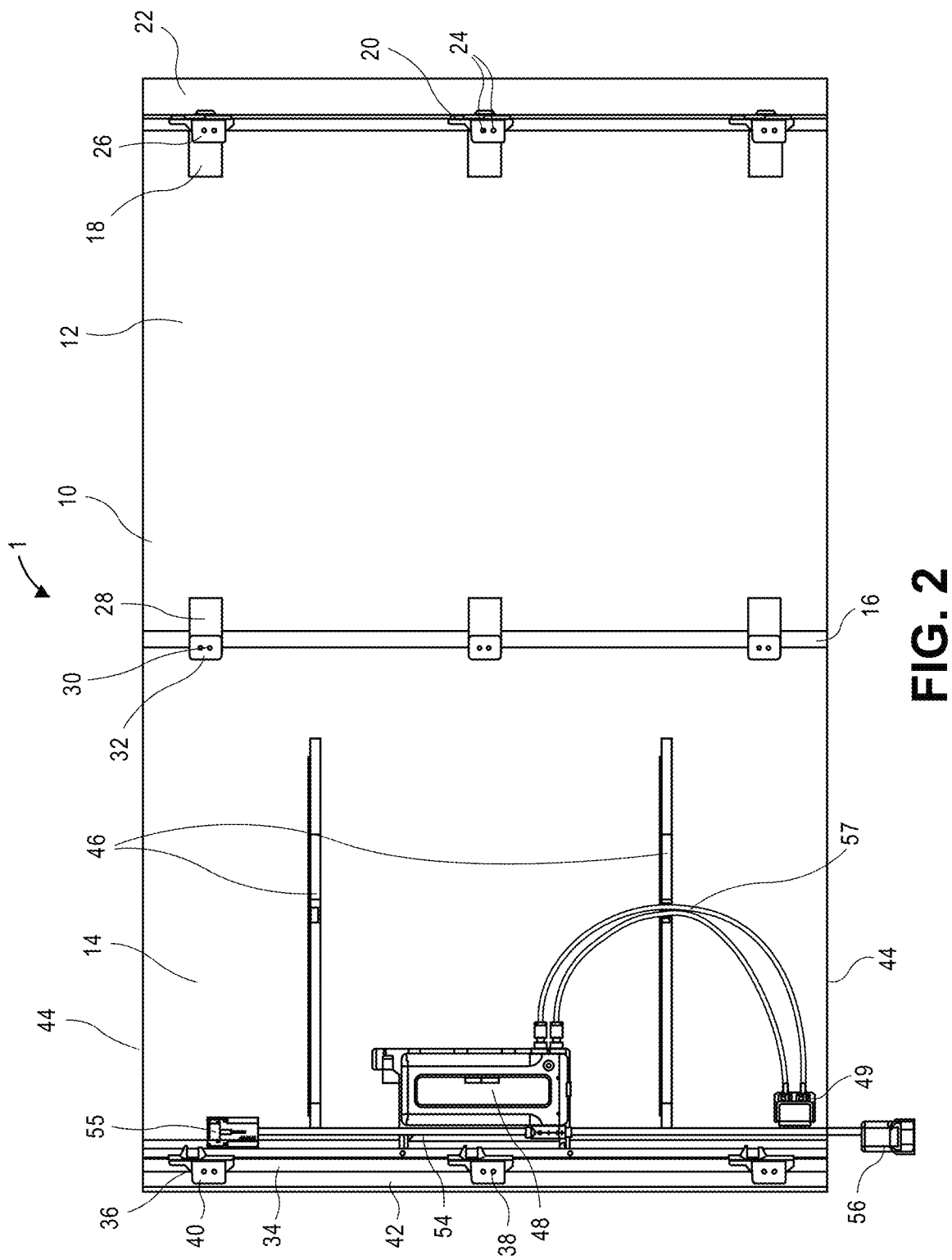
FIG. 2 is a bottom view of the folding PV panel system of FIG. 1, in accordance with embodiments of the present disclosure.
Figure 3:
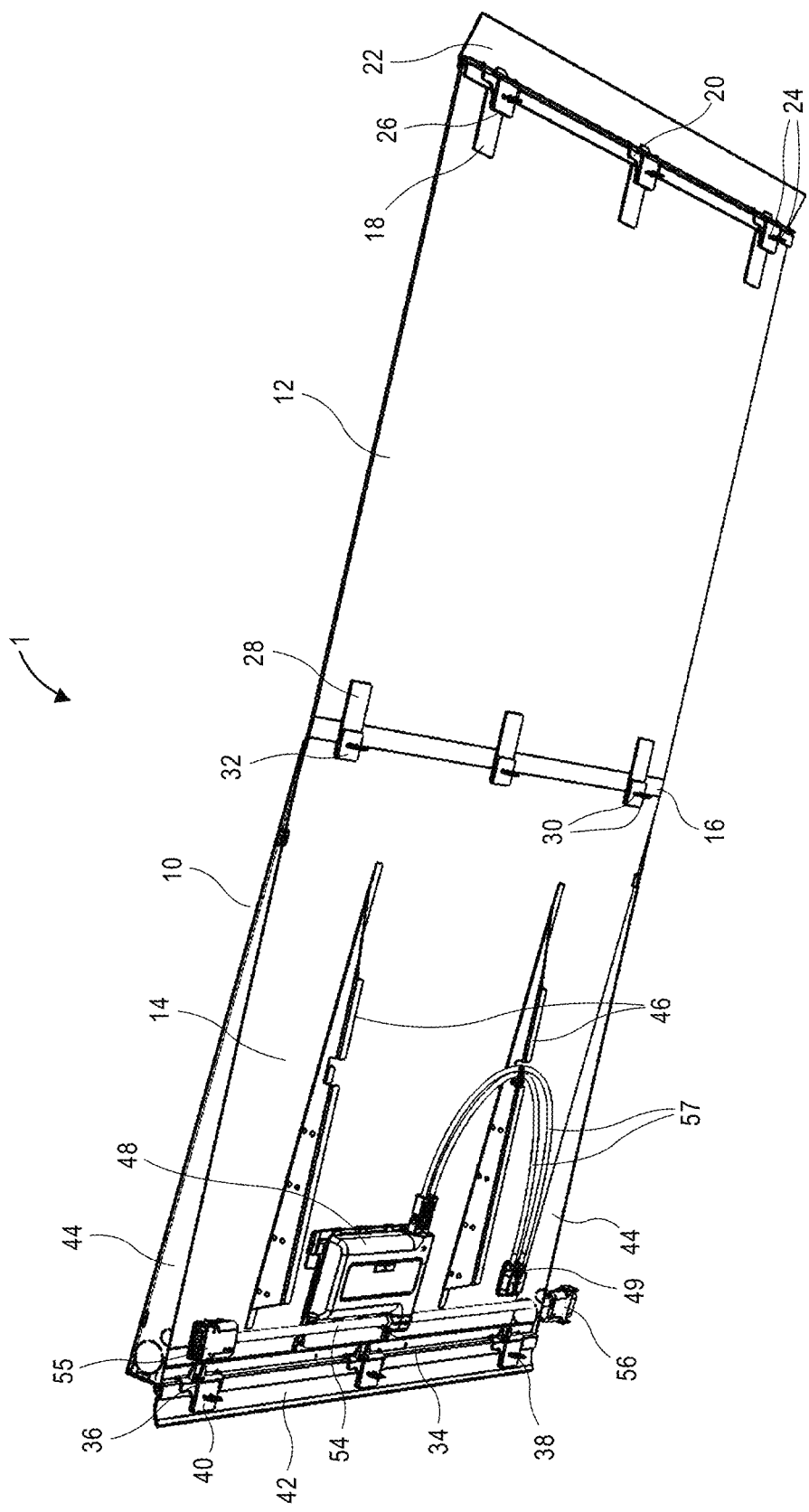
FIG. 3 is an isometric bottom view of the PV panel system of FIG. 1, in accordance with embodiments of the present disclosure.
Figure 5:
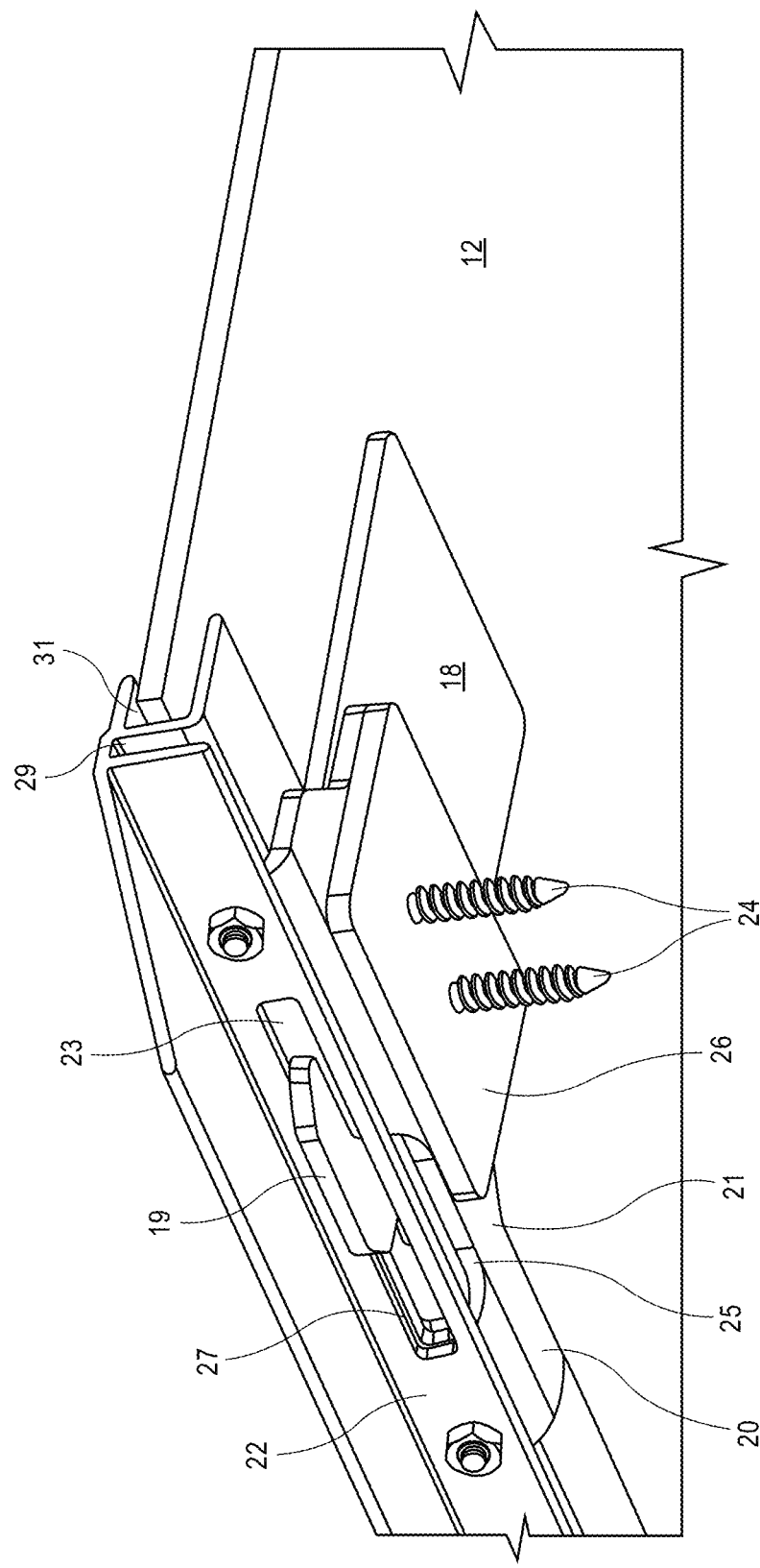
FIG. 5 is a close up isometric cross-sectional view of a rear end portion of the folding PV panel system of FIG. 1, in accordance with embodiments of the present disclosure.

Among the innovative features of as the disclosed systems, methods, and devices is the use of frameless mounting to mount a folding PV panel to a mounting surface. This is accomplished, at least in part, with an integrated flashing and fastener (e.g. hook) system that allows a folding PV Panel to be mount by simply hooking it to a pre-mounted rear mounting flashing. With reference to FIGS. 2, 3, and 5, in embodiments, the first subpanel 12 includes a plurality of mounting hooks 18 affixed to a top end and backside of the first subpanel 12, i.e. the end that opposite of the hinge 16.

The mounting hooks 18 may be mechanically, adhesively, or thermally bonded to the backside of the first subpanel 12. In embodiments with only a single panel, the mounting hooks mat be mounted to the backside of the single panel, for example, to the backside of the second subpanel where the first subpanel is omitted.

As best shown in FIG. 5, the mounting hooks 18 extend beyond the end of the first subpanel 12 and engage with a rear mounting foot 20. The rear mounting foot 20 is coupled to the rear mounting flashing 22 and is configured to mount the rear mounting flashing 22 to a mounting surface (e.g. a roof). The rear mounting foot 20 includes a base plate portion 21, an upper mounting flange portion 23, and a slot 25. An end 19 of the mounting hook 18 slides through the slot 25 and engages with the upper mounting flange portion 23 of the rear mounting foot 20 to secure the first subpanel 12 to the rear mounting foot 20 (see, for example, FIGS. 9A-9C). As shown, the rear mounting flashing 22 includes a channel 29, into which the rear mounting flange portion 23 slots. As shown, the mounting hooks 18 may also pass through slots 27 in the rear mounting flashing 22. Further as shown, the rear mounting foot 20 and rear mounting flashing 22 are coupled together with fasteners; however, the rear mounting foot 20 may be mechanically, adhesively, or thermally bonded to the rear mounting flashing 22. While the rear mounting foot 20 is shown as a separate component from the rear mounting flashing 22 and coupled thereto with fasteners, in alternate embodiments the rear mounting foot 20 and the rear mounting flashing 22 can be formed from a single piece of material, for example extruded, machined or otherwise formed. In embodiments, one or both of the rear mounting foot 20 and is constructed from plastic and/or metal. Typically, to reduce the need for grounding the rear mounting flashing 22 is constructed from a non-conductive material, such as plastic. The rear mounting foot 20 may be coupled to a surface, such as a composite roof, for example, with fasteners 24. In the embodiment shown, the rear mounting foot 20 sits on a deformable mounting pad 26, which is deformable such that it acts as a seal when fasteners 24 are driven into a surface, such as a composite roof, to prevent water ingress. In embodiments, it the deformable mounting pad 26 is formed from a butyl rubber, or other deformable substance that may be used to seal any holes used by the fasteners 24. The deformable mounting pad 26 can be pre-packaged or integrated with the folding PV panel 10 before shipping and/or installation on a mounting surface. In other embodiments, the rear mounting foot 20 may be directly mechanically, adhesively, or thermally bonded to the mounting surface. With continued reference to FIG. 5, the rear mounting flashing may include a channel 31 into which the end of the first subpanel 12 slots or engages when the mounting hooks 18 are engaged with the rear mounting foot 20. The engagement of the end of the first subpanel 12 and the channel 31 may inhibit water and other ingress to the backside of the first subpanel 12.

Figure 6:
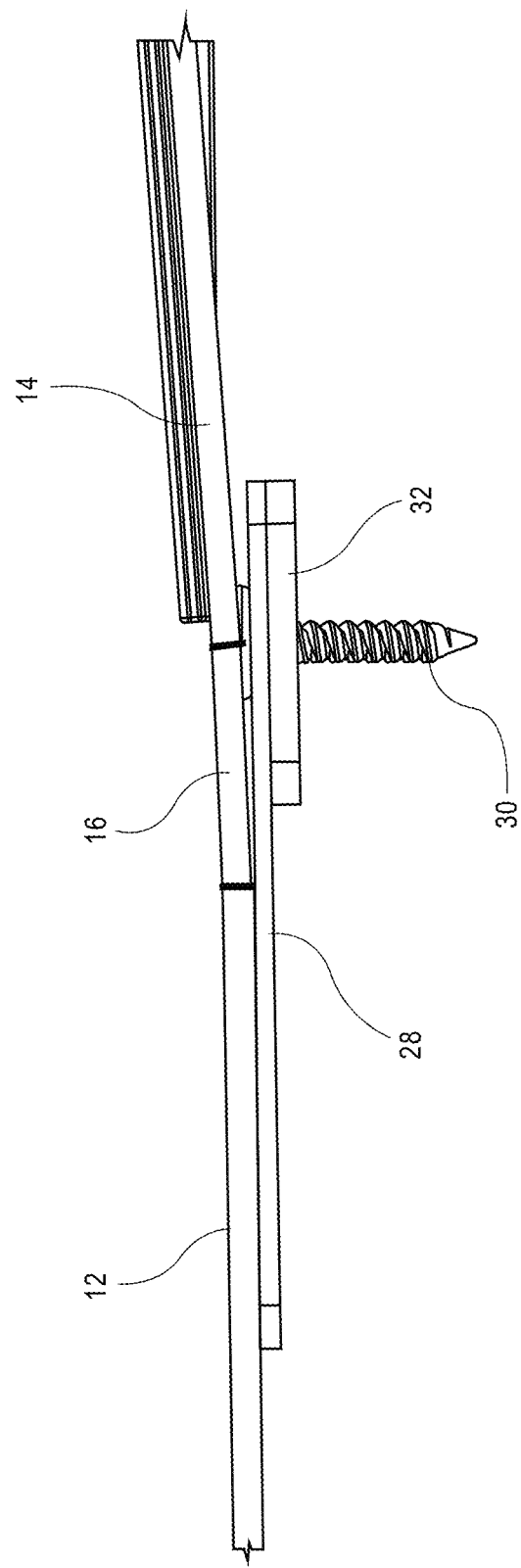
FIG. 6 is a close up isometric cross-sectional view of a central portion of the folding PV panel system of FIG. 1, in accordance with embodiments of the present disclosure.
Figure 7B:
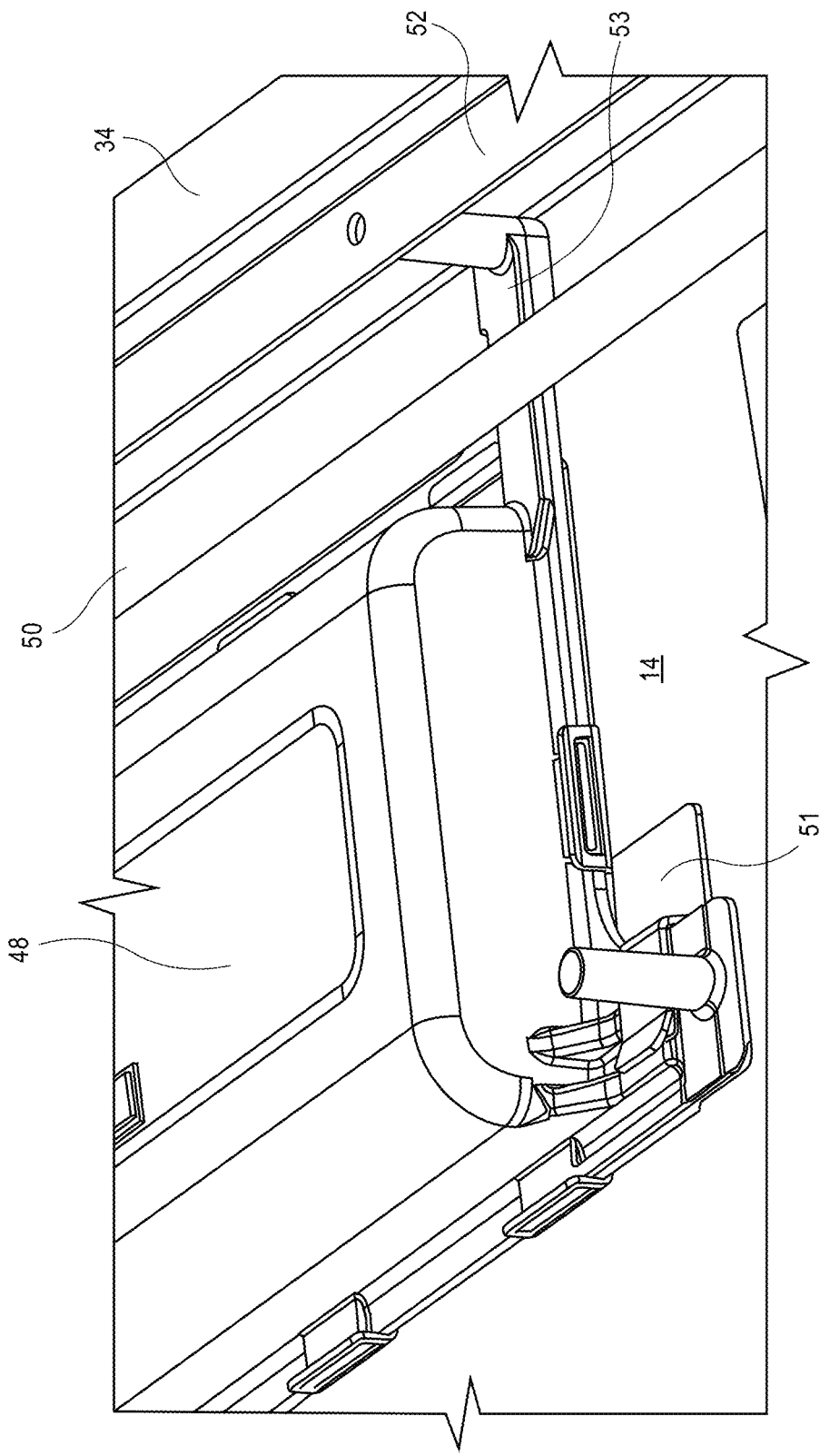
FIG. 7B is a close up isometric view of a front end portion of the folding PV panel system of FIG. 1, in accordance with embodiments of the present disclosure.

As shown in FIGS. 2, 3, and 6, the first subpanel 12 may also include a plurality of central mounting tabs 28. The central mounting tabs 28 are affixed to the backside of the first subpanel 12 and extent from the first subpanel 12 such that when the folding PV panel 10 is folded the ends of the central mounting tabs 28 are visible and can be coupled to a mounting surface, such as a roof of a house or other structure (see, for example, FIG. 10A). The central mounting tabs 28 may be mechanically, adhesively, or thermally bonded to the backside of the first subpanel 12. The central mounting tabs 28 may be coupled to a mounting surface, such as a composite roof, for example, with fasteners 30. In other embodiments, the central mounting tabs 28 may be may be directly mechanically, adhesively, or thermally bonded to the mounting surface. In the embodiment shown, each of the central mounting tabs 28 sit on a deformable mounting pad 32, which is deformable such that it acts as a seal when the fasteners 30 are driven into a surface, such as a composite roof, to prevent water ingress. In embodiments, it the deformable mounting pad 32 is formed from a butyl rubber, or other deformable substance. The deformable mounting pad 31 can be pre-packaged or integrated with the folding PV panel 10 before shipping and/or installation on a mounting surface. In certain embodiments, the central mounting tabs 32 may be omitted.

Figure 4:
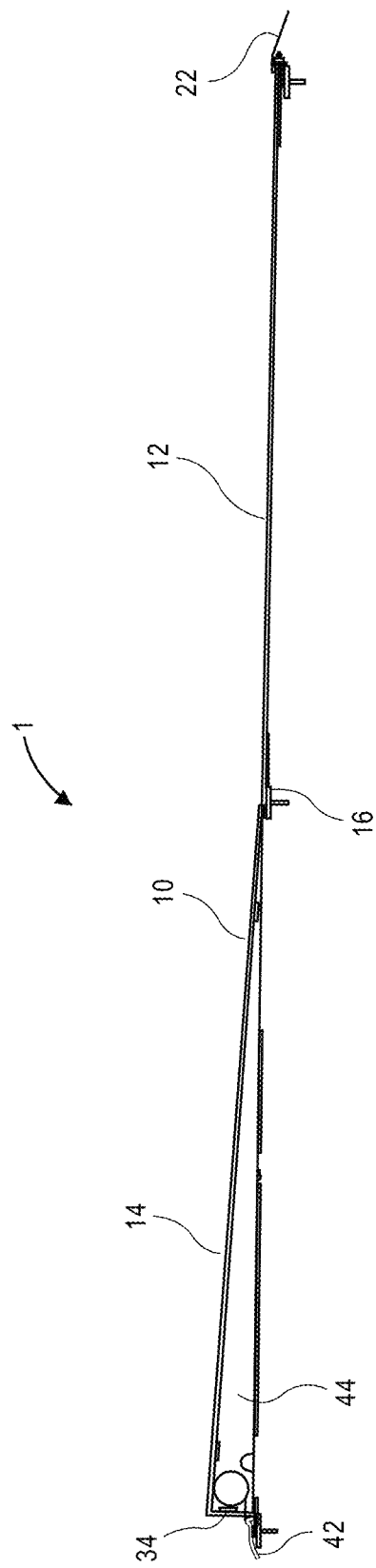
FIG. 4 is a side view of the folding PV panel system of FIG. 1, in accordance with embodiments of the present disclosure.

To create a chamber or housing to secure the electronic components of the PV system from exposure to the elements the second subpanel 14 is raised above the mounting surface (see, for example, FIG. 4). With reference to FIGS. 2, 3, 4, and 7, to accomplish this the front edge of the backside of the second subpanel 14 (i.e. the edge opposite the hinge 16) is coupled to a front edge support 34. The backside of the second subpanel 14 may be mechanically, adhesively, or thermally bonded to the front edge support 34. The front edge support 34 raises the second subpanel 14 away from a mounting surface to create a space to house the electrical components of the folding PV panel 10. The front edge support 34 includes a front mounting foot 36 coupled thereto. In embodiments, one or both of the front mounting foot 36 and the front edge support 34 are constructed from a heat and electrically conductive material, such as metal. As shown, the front mounting foot 36 and the front edge support 34 are coupled together with fasteners; however, the front mounting foot 36 may be mechanically, adhesively, or thermally bonded to the front edge support 34. While the front mounting foot 36 is shown as a separate component from front edge support 34 and coupled thereto with fasteners, in alternate embodiments the front mounting foot 36 and the front edge support 34 can be formed from a single piece of material. The front mounting foot 36 may be coupled to a surface, such as a composite roof, for example, with fasteners 38. In other embodiments, the front mounting foot 36 may be may be directly mechanically, adhesively, or thermally bonded to the mounting surface. The front mounting foot 36 includes a base plate portion 41 and an upper mounting flange portion 37 and a slot 39. In embodiments, the rear mounting foot 20 and the front mounting foot 36 are substantially identical and interchangeable. The use of such interchangeable parts decreases manufacturing costs. In the embodiment shown, the front mounting foot 36 sits on a deformable mounting pad 40, which is deformable such that it acts as a seal when the fasteners 38 are driven into a surface, such as a composite roof, to prevent water ingress. In embodiments, the deformable mounting pad 40 is formed from a butyl rubber, or other deformable substance. The deformable mounting pad 40 can be pre-packaged or integrated with the folding PV panel 10 before shipping and/or installation on a mounting surface.

The combination of the second subpanel 14, the front edge support 34 and, optionally, end covers 44 (and the mounting surface) create a space to house the electronic components of the folding PV panel 10. In embodiments, the folding PV panel 10 includes a power converter 48 (such as a microinverter) mounted on the back surface of the second subpanel 14. In embodiments, the folding PV panel 10 includes a junction box 49 mounted on the back surface of the second subpanel 14. The power converter 48 and/or the junction box 49 may be electrically connected to other components of the folding PV panel 10. For example, one or more of the power converter 48 or the junction box 49 may be electrically connected to an electrical conductor routed along the hinge 16. That is, the electrical conductor may return electrical power from the PV cells to the power converter 48 or the junction box 49. In embodiments, the power converter 48 is electrically coupled to the junction box 49 with cables 57.

As best shown in FIG. 7, the front edge support 34 includes an upper flange 50 and a lower flange 52. The upper flange 50 serves as a mounting surface for the second subpanel 14. The lower flange 52 serves as a mounting surface for mounting tabs 53 of the power converter 48 as well as a heat sink and ground for the power converter 48. By constructing the front edge support 34 out of a heat and electrical conducting material, such as metal, for example, aluminum, the front edge support 34 is multifunctional and reduces the need for additional cooling and/or additional ground wires. By mounting the power converter 48 directly to the front edge support 34 the need for a ground cable is eliminated. Similarly, a back sheet of the second subpanel 14 may be fabricated from metal, and thus, the metal back sheet may be electrically grounded to the front edge support 34.

A substantially solid front edge support 34 is shown; however, it is contemplated that the front edge support 34 may include one or more holes or perforations that allow heat to escape from the backside of the subpanel 14, for example allowing the power converter 48 to cool. In some examples the holes or perforations are one way valves that allow air or heat to escape, but do not allow wind or the elements to enter.

In addition to housing the power converter 48 and/or junction box 49, the space between the backside of the second subpanel 14 and the mounting surface may enclose electrical cables, e.g., alternating current or direct current cables 54, and connectors 55 and 56 used to transfer electrical power between the PV cells, individual folding PV panels 10 and/or an electrical power distribution network. The space can isolate and protect the various enclosed components from a surrounding environment. For example, the combination of the second subpanel 14, the front edge support 34, and optionally the end covers 44 can provide a rain shield and flashing for water shedding. In embodiments, the folding PV panel 10 can include cabling management features. For example, built or attached cable/connectors or cabling management features. The features may keep components raised. More particularly, the features may hold the components at a location that is spaced apart from the second subpanel 14, or from other surfaces that may come into contact with water.

Couplable to the front of the front edge support 34 is an optional front flashing 42, that is mountable to the front edge support 34 to prevent water, wind, or other elements/debris/ animal from ingress. In addition, the optional front flashing 42 covers the front mounting foot 36 and fasteners 38, presenting a more esthetically pleasing appearance, for example, relative to the absence of the front flashing 42. In embodiments, the front flashing 42 includes a flexible portion 43 that is configured to slide into and create a tight seal with a channel 46 in the front edge support 34. In embodiments, the front flashing 42 includes tabs 45 that slide through the slot 39 and engage with the upper mounting flange portion 37 of the front mounting foot 36 to secure the front flashing 42 to the front mounting foot 36.

As best shown in the FIGS. 3 and 4, the sides of the second subpanel 14 may include optional end covers 44 that serve to further enclose the space between the mounting surface and the second subpanel 12. The optional side panels 44 are typically found at the ends of a run of folding PV panels (see, for example, the run of panels depicted in FIG. 13). The optional end covers 44 may be mountable with clips such that the optional end covers 44 can be added or removed at will.

As best shown in FIGS. 2 and 3 the folding PV panel 10 may further include a plurality of support ribs 46 affixed to the bottom surface of the second subpanel 14. These support ribs 46 inhibit the subpanel 14 from sagging or flexing, for example, when under load, such as wind sheer, snow or rain, or even under the own weight of second subpanel 14. Alternatively, other stiffening/support elements may be used, such as pegs, stiffening members, or just making the second subpanel 14 stiffer. The support ribs 46 may be mechanically, adhesively, or thermally bonded to the second subpanel 14.

The folding PV panel 10 is primarily described as an alternating current type PV panel herein, however, the folding PV panel 10 may have a different panel architecture. For example, the folding PV panel 10 may have a direct current (DC) panel architecture. Accordingly, other components may be mounted on the bottom surface of the first and/or second subpanels 12 and 14. For example, a DC optimizer may be mounted on a bottom surface of the second subpanel 14 and may be enclosed.

Each subpanel 12 and 14, and optionally each hinge 16, of the folding PV panel 10, can be constructed of primarily polymeric materials. The polymeric construction of the subpanel 12 and 14 may exclude the PV cells, electrical interconnects, etc. More particularly, the polymeric construction may refer to the laminate layers of the subpanel. Or, at least one or more of a front cover, front sheet or a back sheet of each subpanel may be fabricated from polymer, such as for example, thermoplastic polymer, polymer composites or glass-filled polymer. Accordingly, the subpanels 12 and 14 and the folding PV panel 10 may be flexible and/or lightweight. In embodiments, one or more of the first or second subpanel is rigid, for example including a front cover, such as a glass or rigid plastic front cover. In embodiments, a front cover is not included, for example, so that the subpanels may have some degree of flexibility.

In embodiments, the first subpanel 12 and/or second subpanel 14 includes a PV cell between a front sheet and a back sheet. The front sheet may be a thin glass or polymer layer. Such a construction may contrast with typical thick glass front sheets that are supported by frames. More particularly, the front sheet may be thin, polymeric, and/or frameless, and thus, the front sheet may be lightweight. Non-limiting examples of front sheet materials include ethylene tetrafluoroethylene (ETFE), Fluorinated ethylene propylene (FEP), Polyvinylidene difluoride (PVDF), Polyvinylidene fluoride (PVF), Polyethylene terephthalate (PET), glass and combinations or derivatives thereof. In an embodiment, the back sheet of the first subpanel 12 and/or second subpanel 14 may be a metal, polymer, glass, fiber reinforced polymer (e.g., fiber-glass reinforced polymer or polymer-reinforced polymer), a polymer matrix, or the like, or combinations thereof. Non-limiting examples of back sheet materials include glass, Polyethylene terephthalate (PET), Tedlar polyester (TPT), Thermoplastic elastomers (TPE), epoxy-, phenolic-, polypropylene-, vinylester-, or polyester-based fiber reinforced polymers (e.g. G10, G11, FR4, FR5), and combinations or derivatives thereof. The thickness of the back sheet can be in the range of 0.8 mm-2 mm for polymer laminates and 1 mm-3.2 mm for glass-based back sheets.

In one example, an intermediate UV (ultraviolet) light blocking layer can be included in the laminate, for example if the back sheet itself has limited UV stability. Non-limiting examples of a UV blocking layer include an opaque encapsulant (e.g. white or other colored polymer (e.g. oligomer or polymer of ethylene oxide like polyolefin elastomer (POE), ionomer, thermoplastic olefin (TPO). As another example, the back sheet can be painted with a UV blocking layer (e.g. solder mask, UV stable paint, etc.). As yet another example, a UV blocking front sheet and/or an opaque polymer interlayer (e.g. conventional PV back sheet materials) can be employed. The back sheet can be selected to have a minimum Relative Temperature Index (RTI) rating of 90° C., or more particularly from 105° C. to 130° C. to pass UL or other safety certification. More heat resistant materials that used in typical module back sheet may be employed. In some implementations, an outermost layer that has a high RTI rating even if it not a structural component may be used. For example, material such as Tedlar, Tedlar polyester (TPT), Ethylene tetrafluoroethylene (ETFE), Fluorinated ethylene propylene (FEP) could be employed rather than Polyethylene terephthalate (PET). This approach could be used at the seam or hinge assembly wherein the backmost material is an RTI rated but non-structural layer, but with the added constraint that it be flexible enough to allow for hinge or folding function.

In some implementations, core-shell constructions may be used. For example, a honeycomb or a foam filler can be employed as an interlayer within the back sheet to add stiffness with minimal weight. The filler can also be the same adhesive but with chopped fiber to reduce cost. As yet another example, a back sheet, interlayer and/or front sheet can be formed from of chopped fiber and adhesive such as epoxy or polypropylene (PP) (e.g. polypropylene fused into glass fibers), although chopped fibers at the surface of the laminate may have a detrimental effect on void creation during lamination. Non-limiting examples of fiber materials include glass, carbon, aramid, or basalt which can be woven, unidirectional, chopped or otherwise processed.

The PV cell may be any PV cell type. For example, the solar or PV cell may be an interdigitated back contact cell, a front contact cell having overlapping cell sections, or a front contact cell. More particularly, the PV cell may be any known PV cell for converting insolation into electrical energy. In an embodiment, the first subpanel includes a first encapsulant layer (e.g., 100 μm-1000 μm thick) between the front sheet and the PV cell. The first encapsulant layer may be formed from an encapsulant material. For example, the encapsulant material may harden after curing to form a thin transparent film between the front sheet and the PV cell. Non-limiting examples of encapsulant materials include ethylene-vinyl acetate (EVA), thermoplastic olefin (TPO), polyolefin (PO), Thermoplastic polyurethane (TPU), Ionomers, and combinations or derivatives thereof. Similarly, the first subpanel may include a second encapsulant layer (e.g., 100 μm-1000 μm thick) between the PV cell and the back sheet. Accordingly, the PV cell may be encapsulated between the front sheet and the back sheet to form a frameless and lightweight first subpanel that can be mounted directly on a roof. Thus, each subpanel of the folding PV panel may be a lightweight laminate, and the folding PV panel may be easy to handle and have a high wattage per pound ratio.

In some implementations, the first and the second subpanel may have a different construction. For example, the materials and/or dimensions may differ by subpanel. A different set of encapsulants, front sheets and/or back sheets can be used for each subpanel, for example if a particular subpanel supports module-level power electronics (e.g. inverter) or if a subpanel provides additional mounting support. For example, the second subpanel can be stiffer or more rigid to resist mechanical loading compared to the first subpanel.

One or more electrical or electronic components may be integrated in the laminate structure of the second subpanel. For example, a diode may be mounted on or in the second subpanel. The diode may be disposed between the front sheet and the back sheet of the subpanel, e.g., within one of the encapsulant layers (e.g., an in-laminate diode). Accordingly, an in-laminate diode may provide diode protection for the folding PV panel. Alternatively, the diode may be mounted within the junction box to provide diode protection for the folding PV panel.

Referring to FIGS. 8A-14, aspects of a method of mounting or installing one or more folding PV panels 10 is shown in accordance with various embodiments of the present disclosure. A flow chart illustrating a method 1400 of installation or mounting 1400 one or more PV panels is provided in FIG. 14.

Turning to block 1410 and with reference to FIG. 8A, at the installation site, the folding PV panel 10 its folded state may be placed on mounting structure, such as the roof of a building or other structure.

Turning to block 1420 and with reference to FIG. 8B a mounting reference line may be struck to align the rear mounting flashing 22. One or more of the rear mounting flashing 22 may be used, for example, depending on the length of the run and or how many folding PV panels 10 are to be mounted laterally along the line. The rear mounting flashing 22 is aligned with the line (alternately it could be freehanded) and, as shown in FIG. 8C, mounted to the mounting surface, for example, with fasteners 24 driven through the rear mounting feet 20.

Turning to block 1430 and with reference to FIGS. 9A-9C, once the rear mounting flashing 22 has been mounted to the mounting surface, the first subpanel 12 is coupled to the rear mounting flashing 22 using the mounting hooks 18 and the rear mounting foot 20. With reference to FIG. 9A, and as described above, the mounting hooks 18 couple with the slot (not shown in this view) of the rear mounting foot 20. Sliding the hooks 18 in and over (see arrows in FIG. 9A) the first subpanel 12 and thus the folding PV panel can be securely coupled to the rear mounting flashing 22 (see FIGS. 9A and 9C).

Figure 11:
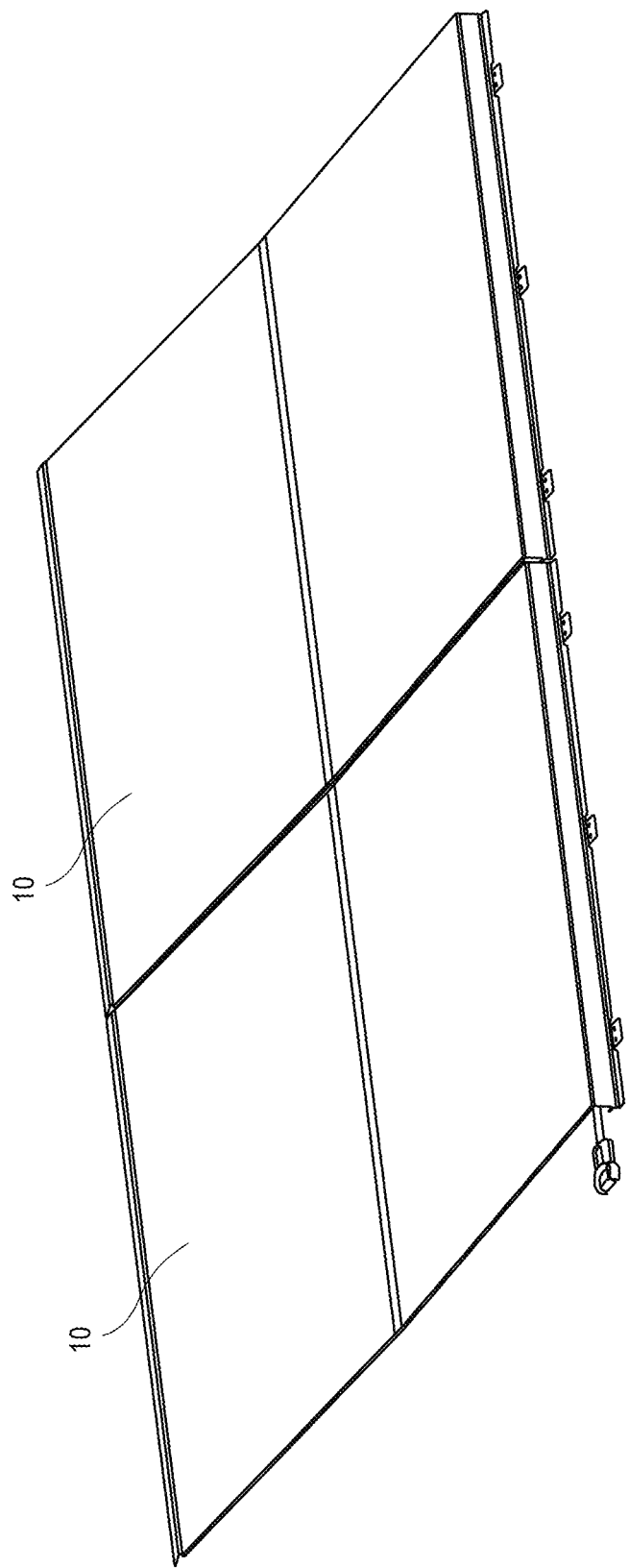
FIG. 11 illustrates the placement of two folding PV panels on a mounting surface.
Figure 12B:
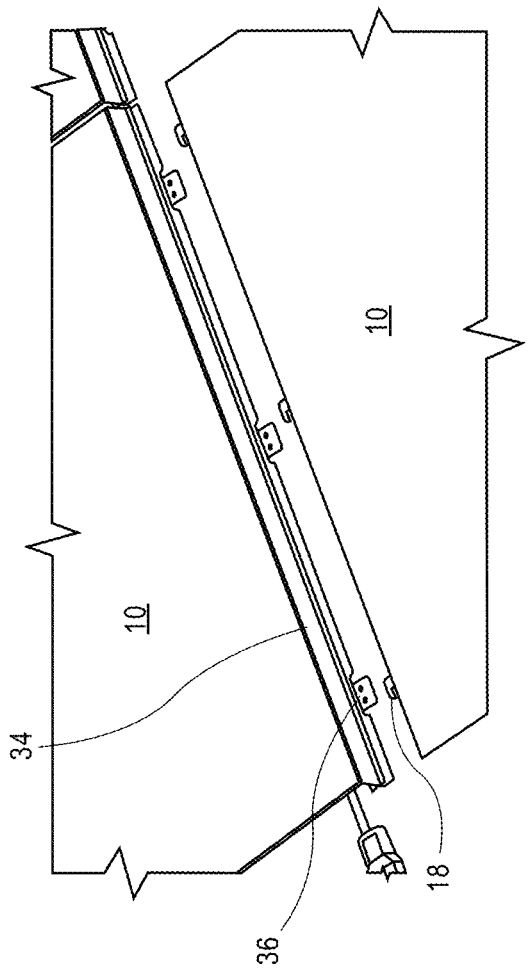
FIGS. 12A-12D illustrate the mounting of a second folding PV panel to the front of a first folding PV panel that has been mounted to a mounting surface, in accordance with embodiments of the present disclosure.
Figure 12D:
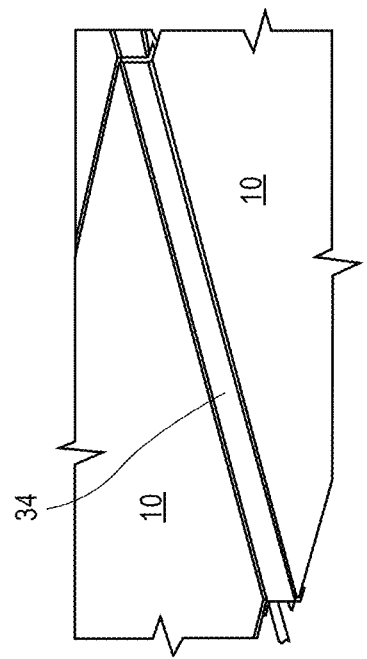
Figure 12A:
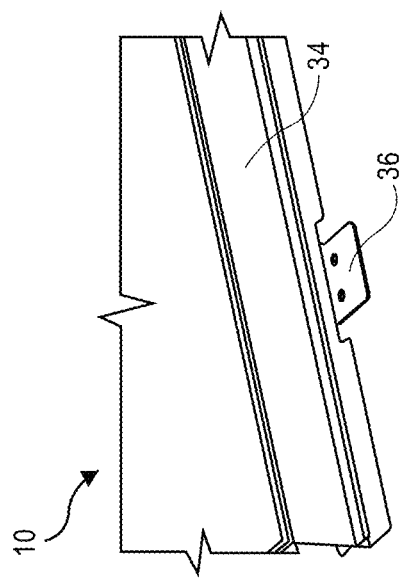
Figure 12C:
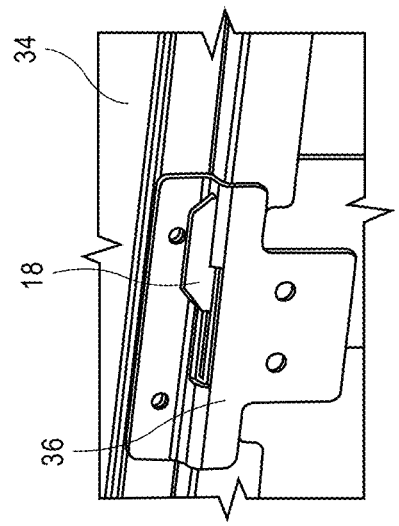

Turning to block 1435, in an embodiment, two or more folding PV panels can be mounted side-by side together at the installation site (see, for example FIG. 11). For example, a first folding PV panel on the roof adjacent to a second folding PV panel. The folded PV panels may have respective edges of their respective first subpanels placed immediately adjacent to one another and parallel to each other. Prior to or concurrent with unfolding of the folded PV panels, the folded PV panels can be electrically coupled to one another, for example in parallel or in series.

Figure 10B:
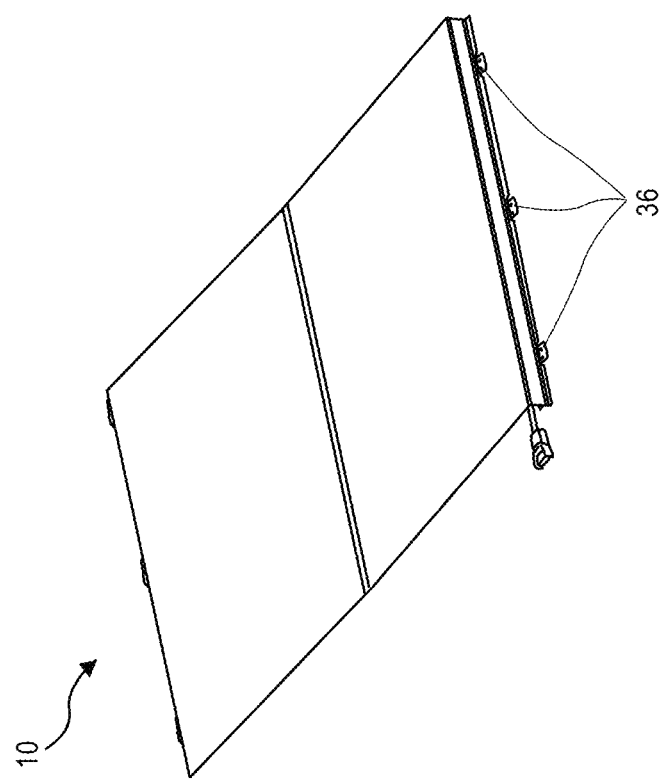
FIGS. 10A and 10B illustrate the mounting of a folding PV panel to a mounting surface, in accordance with embodiments of the present disclosure.
Figure 10A:
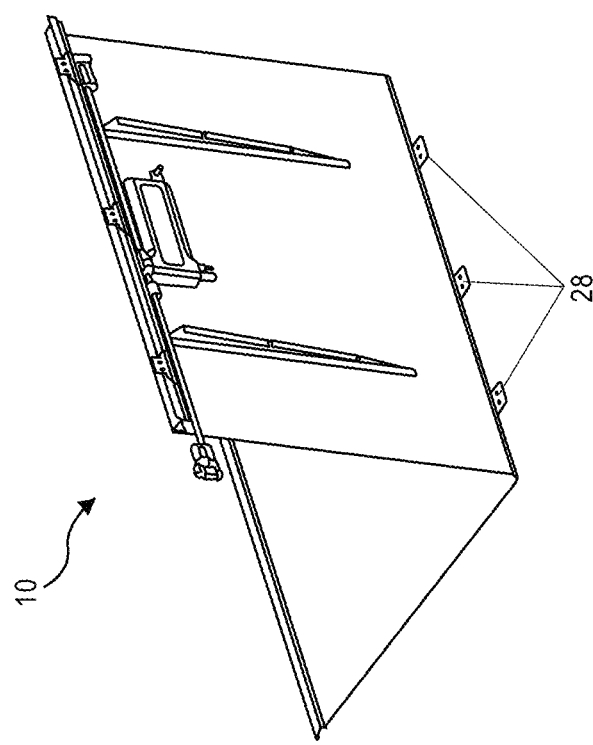

Turning to block 1440 and with reference to FIG. 10A, once the rear end of folding PV panel (or panels) is secured, the central mounting tabs 28 may be mounted to the mounting surface and, in block 1450, the folding PV panel 10 unfolded.

Figure 13:
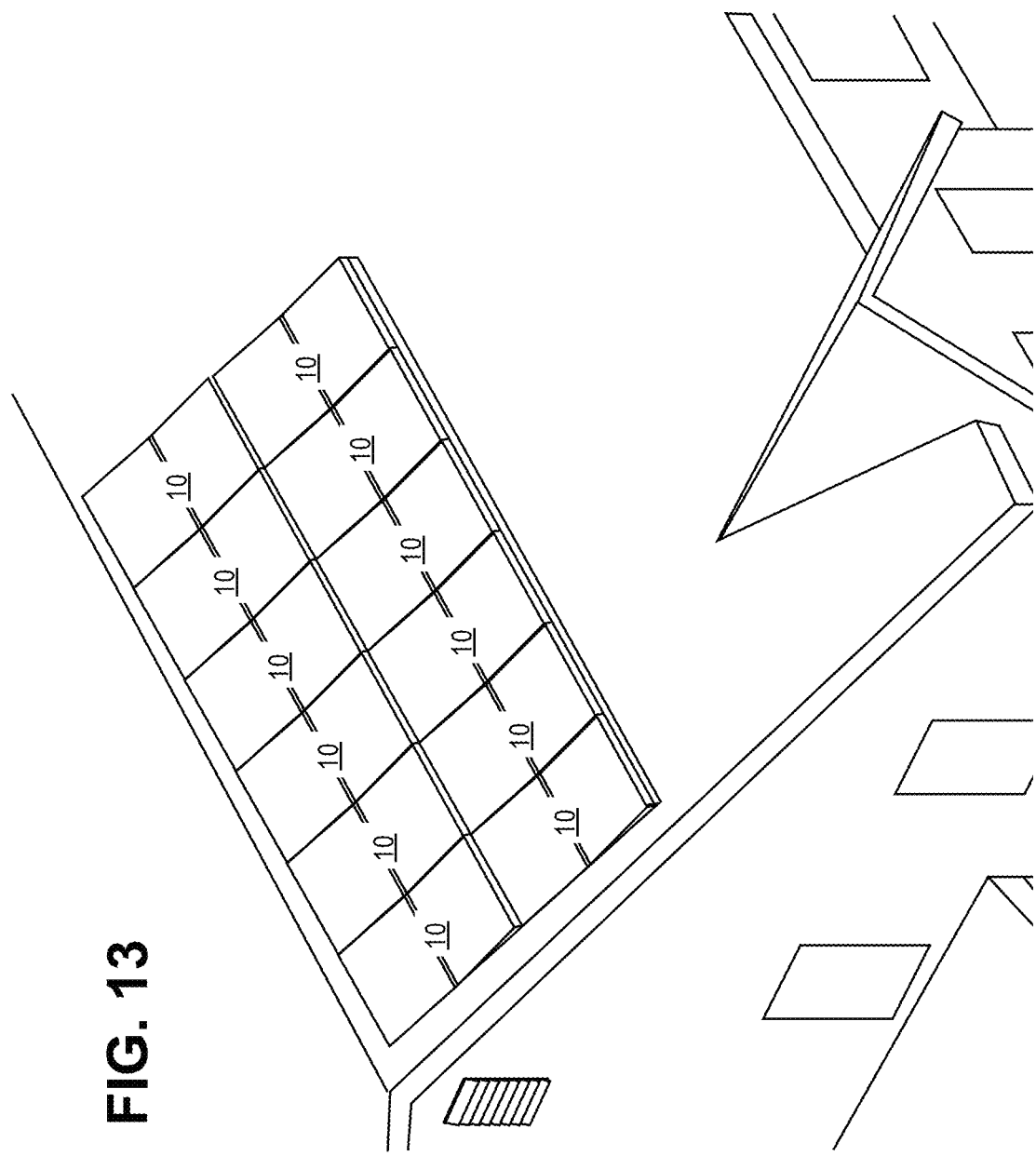
FIG. 13 an isometric view illustrating the installation of an array of folding PV panels to the roof or a building, in accordance with embodiments of the present disclosure.
Figure 14:
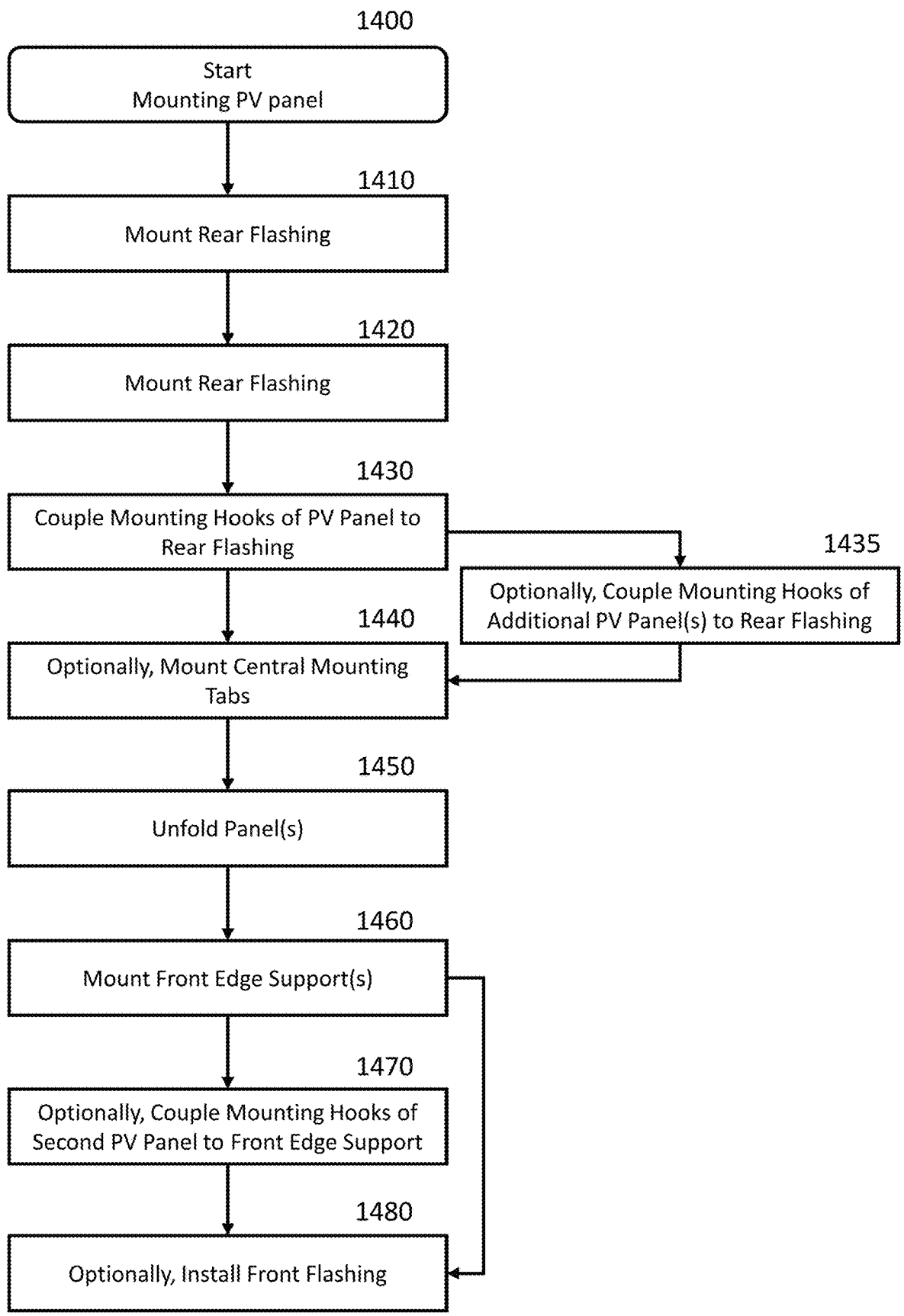
FIG. 14 is a flow chart illustrating the mounting of folding PV panels to a surface, in accordance with embodiments of the present disclosure.

Turning to block 1460 and with reference to FIG. 10B, once unfolded by spreading the hinges to open the angle between the subpanels the front mounting feet 36 can be used to mount the front edge support of the folding PV panel 10 to the mounting surface. While typically the folding PV panels are mounted with the rear end toward the peak of a roof, as is shown in FIG. 13, the folding PV panels can be mounted in any orientation. For example, the subpanels may be mounted in a portrait orientation in which a longest edge of the subpanels is directed sideways along the roof. Alternatively, the subpanels may be mounted in a landscape orientation in which the longest edge of the subpanels is directed upward along the roof, or even on a flat surface. The folding PV panels can be electrically connected to each other, e.g., in parallel or in series. Accordingly, several folding PV panels can be mounted in a larger PV array, such as shown in FIG. 13. At block 1480, optionally, a front flashing may be installed.

One of the advantages of the disclosed systems, devices, and methods is the front mounting hardware, e.g. the front mounting foot, of one folding PV panel can be used in place of the rear mounting flashing to mount a second PV panel.

Figure 38:
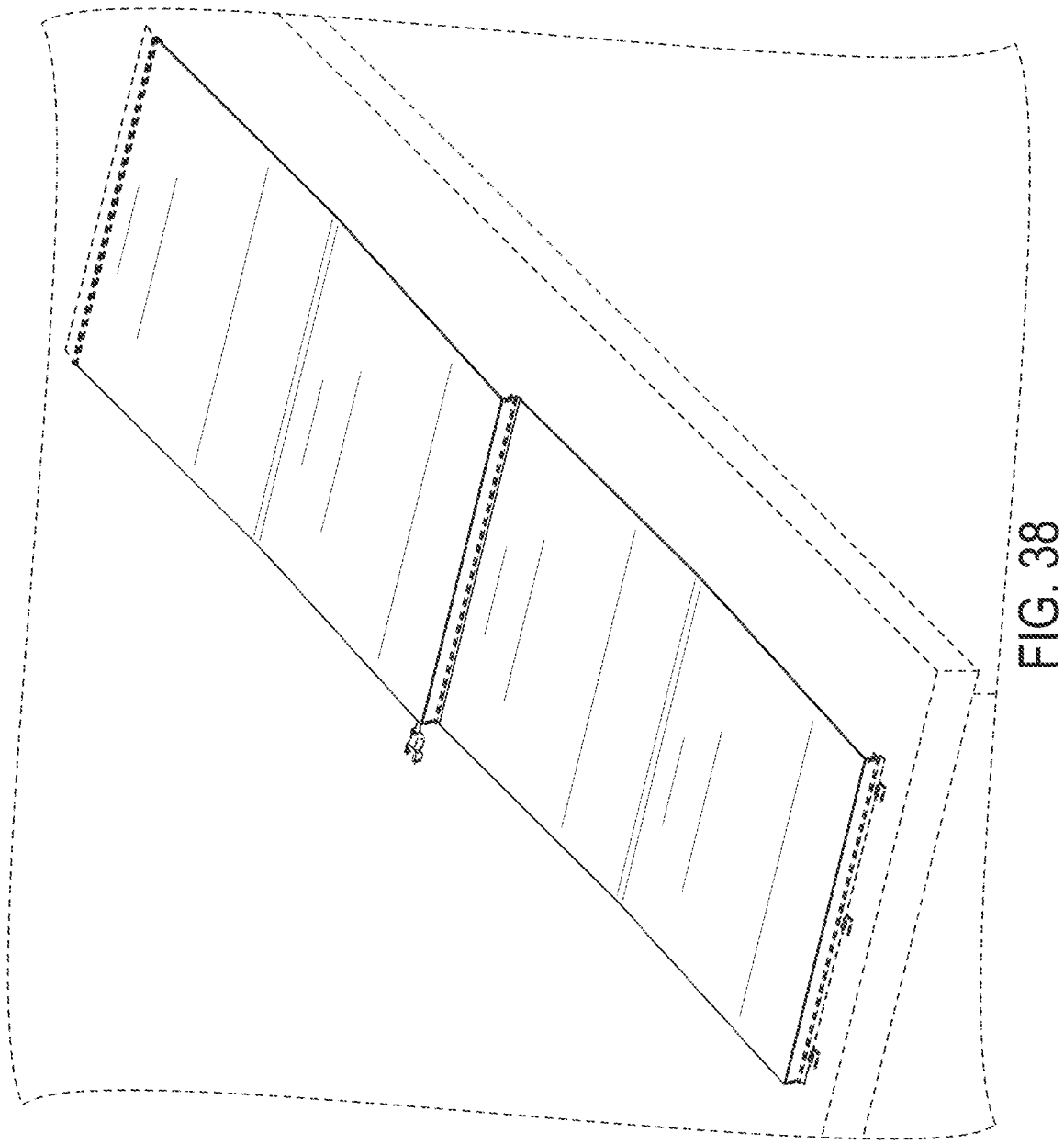
Figure 40:
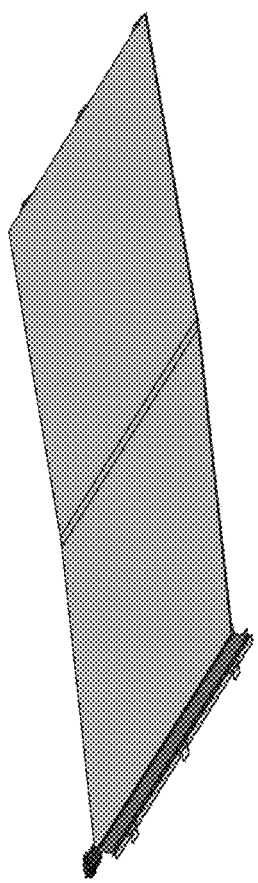
Figure 41:
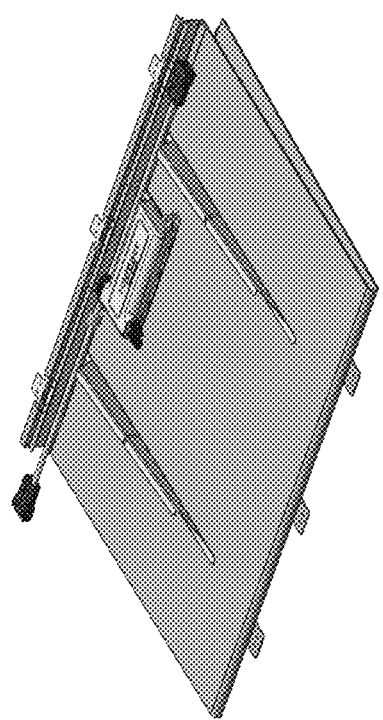
Figure 39:
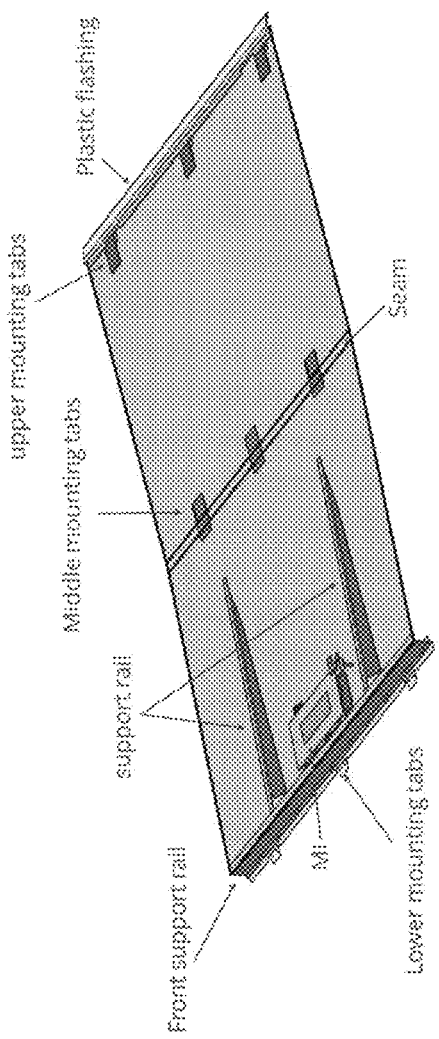
Figure 42:
Figure 51:
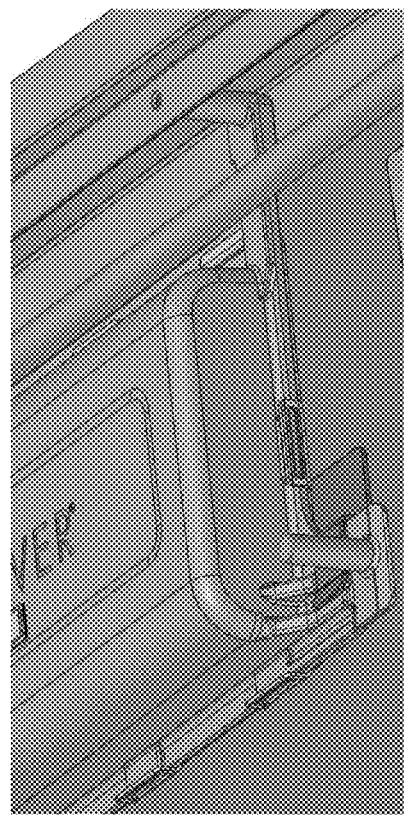
Figure 52:
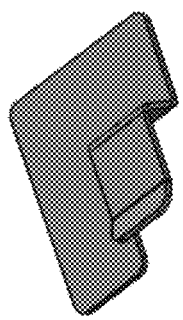
Figure 50:
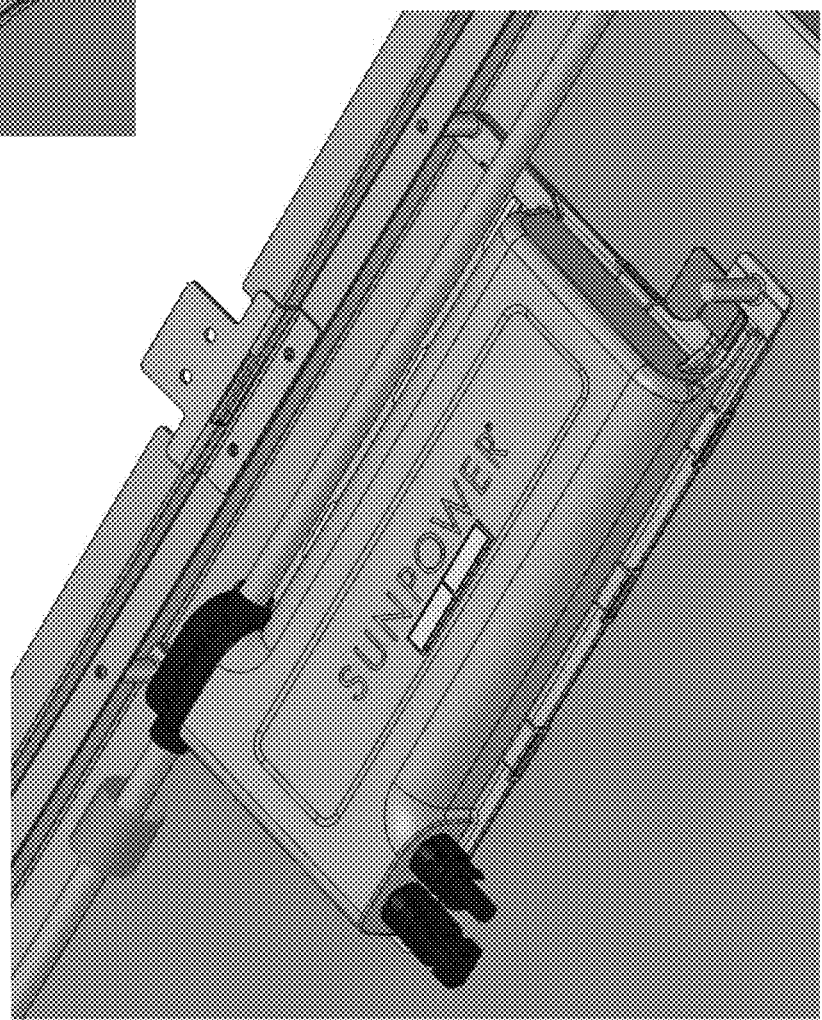
Figure 53:
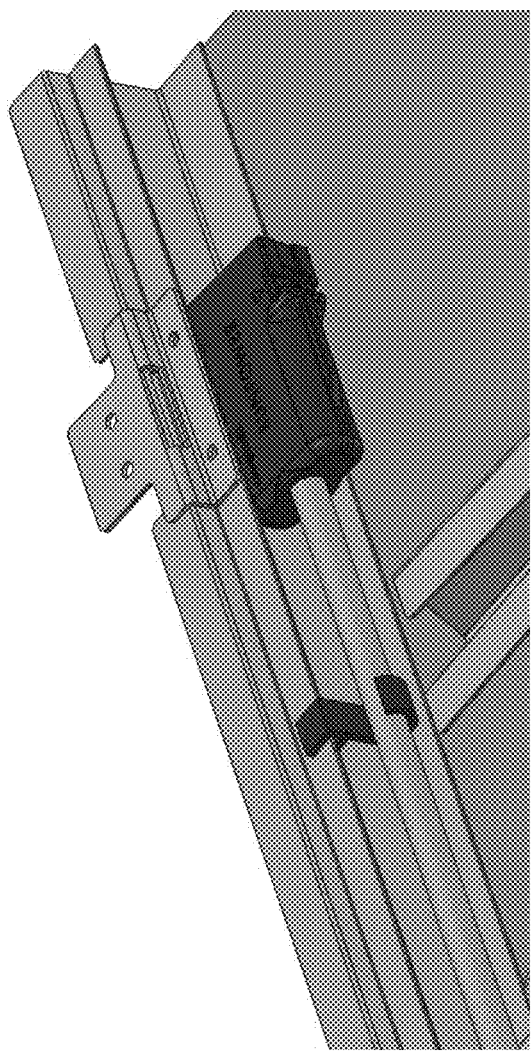
Figure 55:
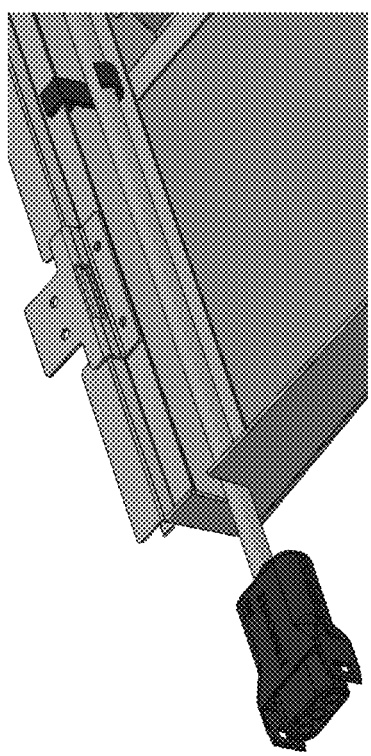
Figure 54:
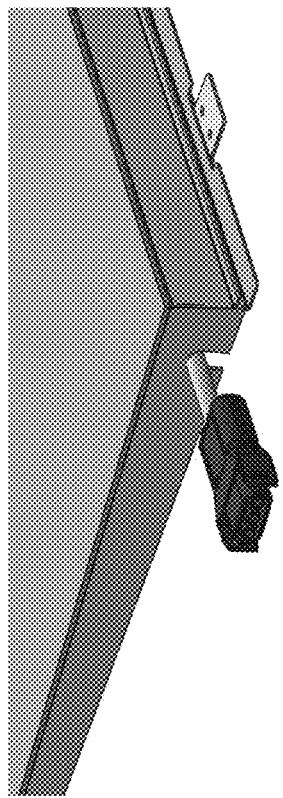
Figure 56:
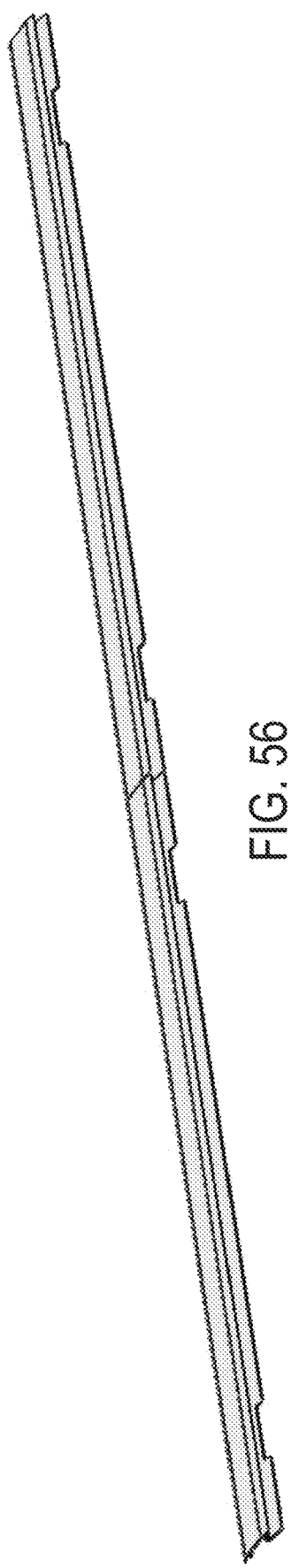
Figure 58:
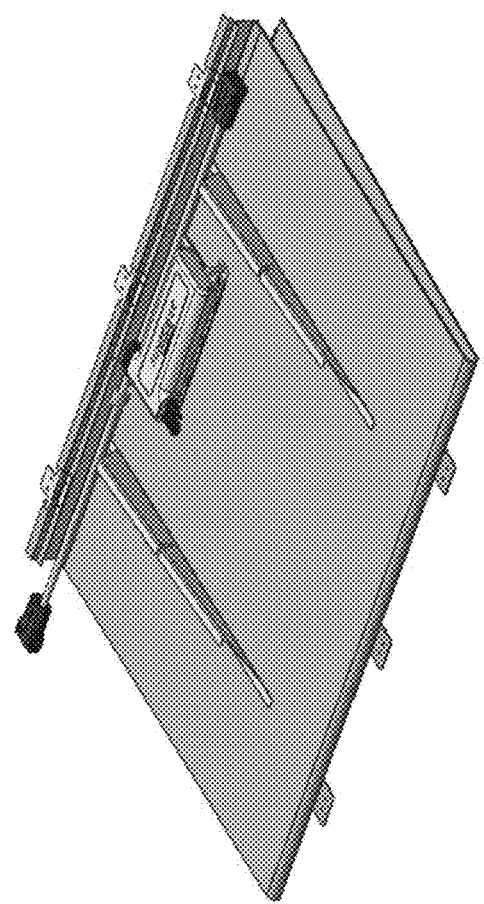
Figure 57:
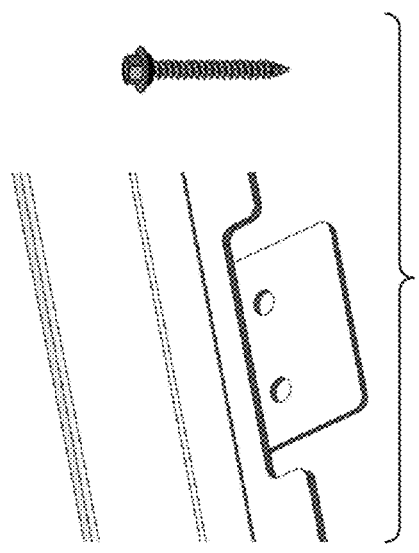
Figure 60:
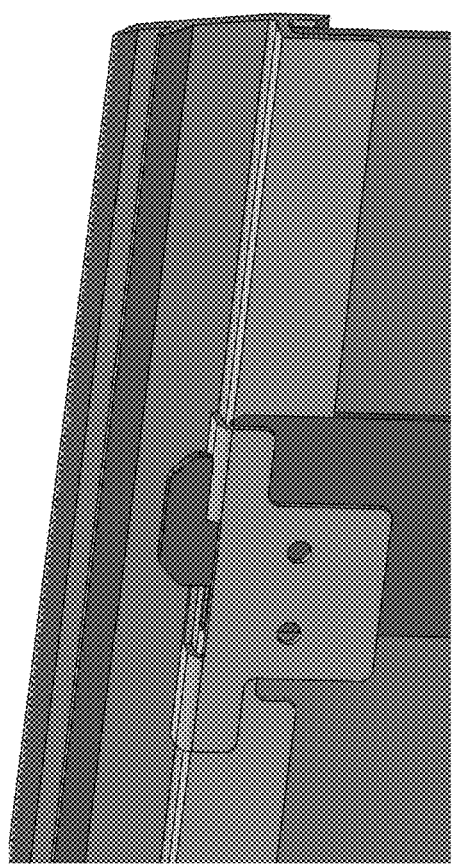
Figure 61:
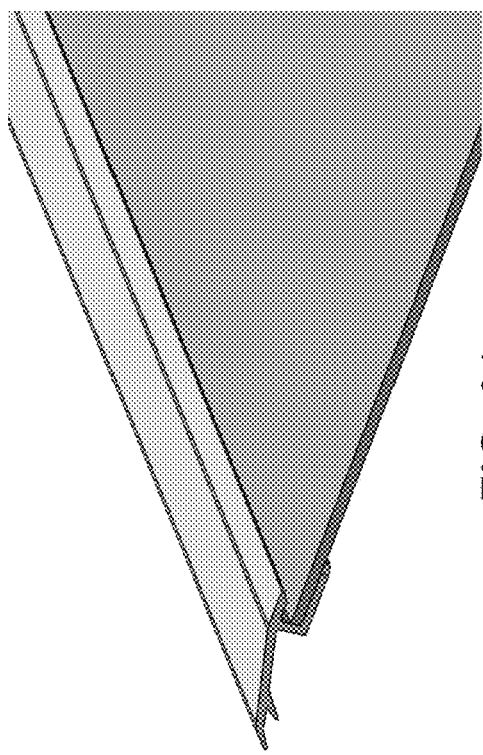
Figure 59:
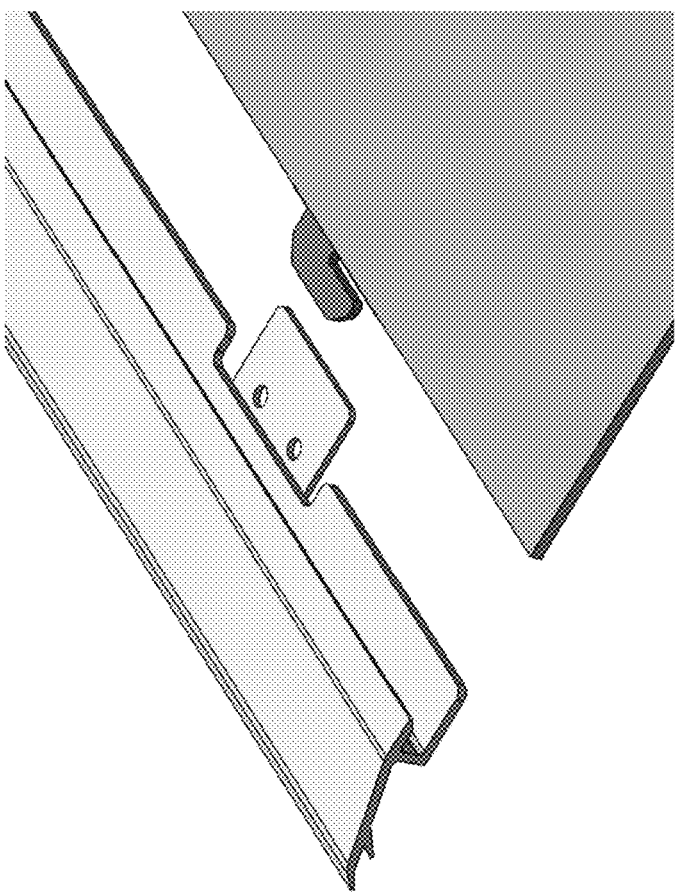
Figure 62:
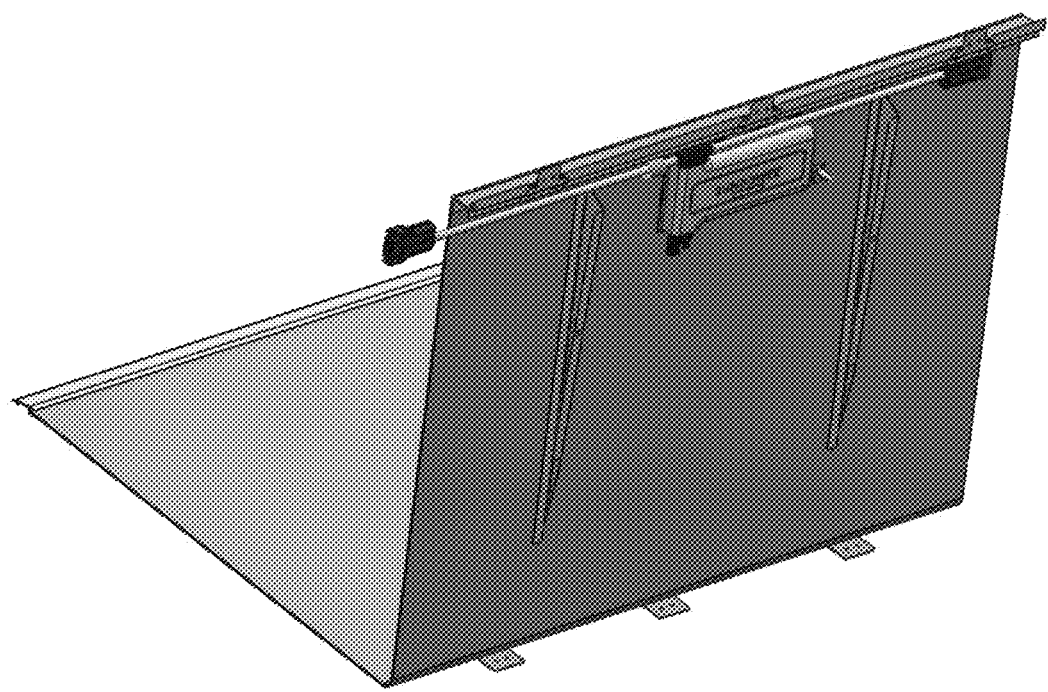
Figure 63:
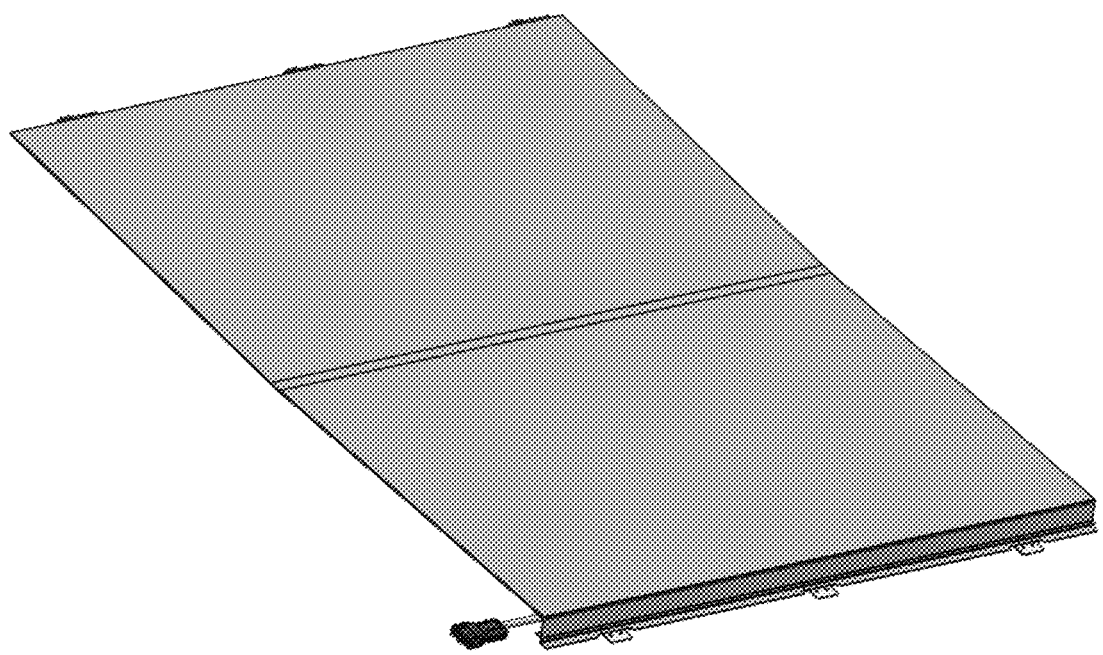
Figure 64:
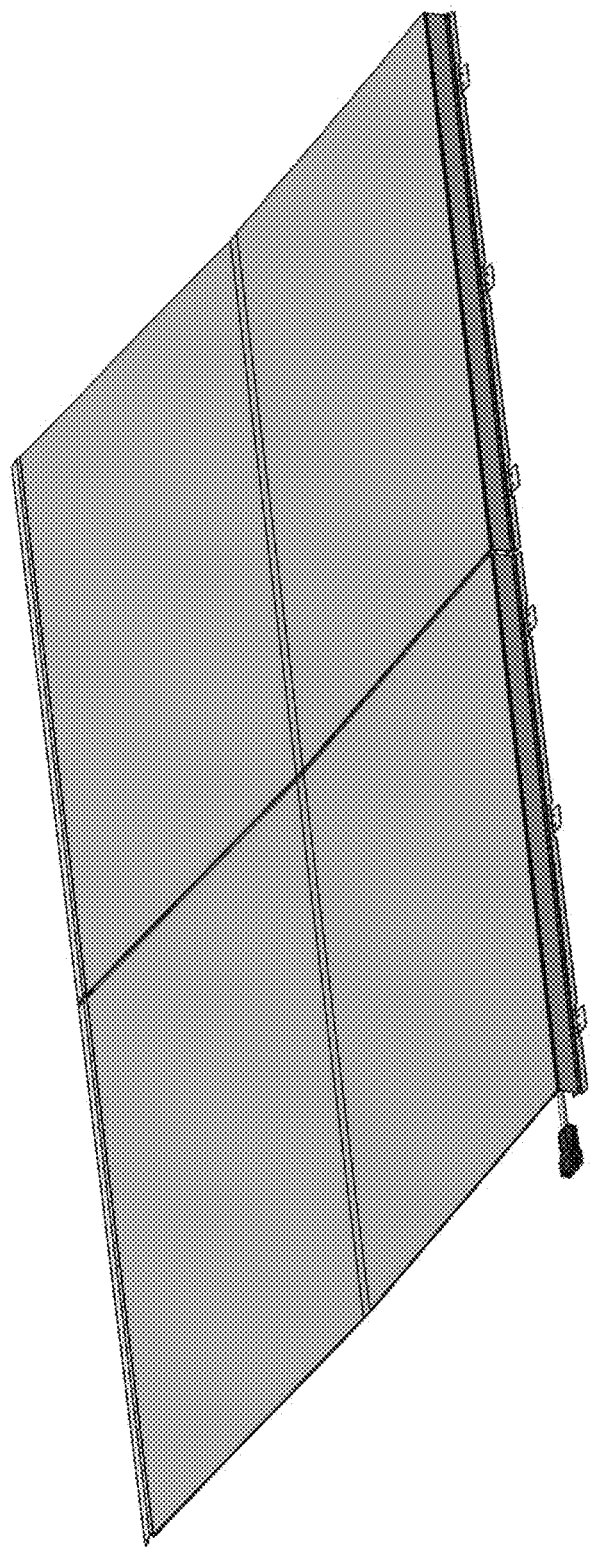
Figure 66:
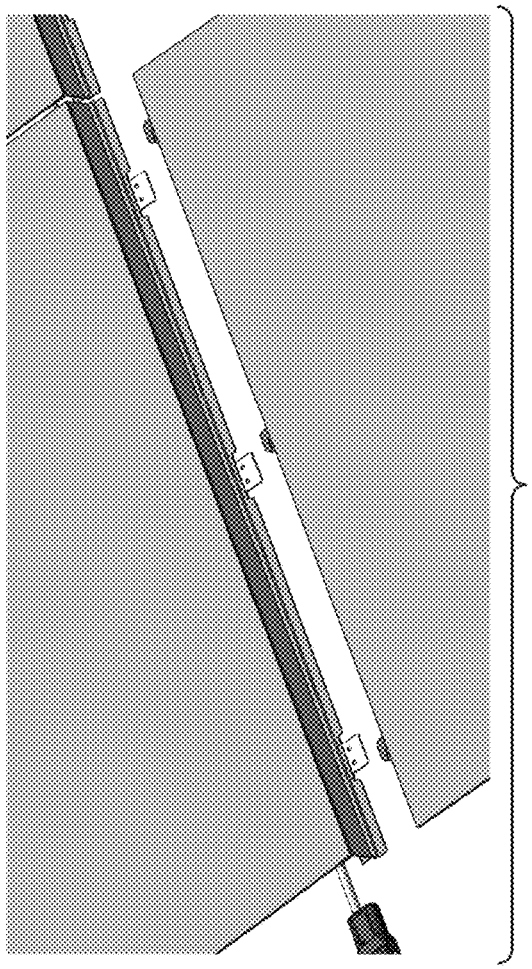
Figure 68:
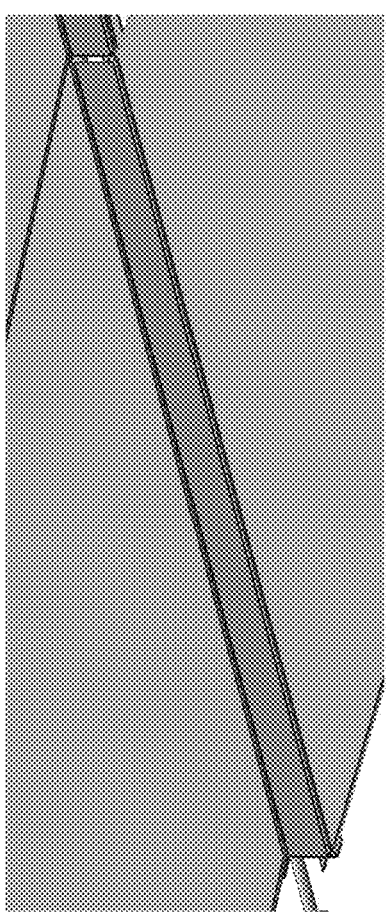
Figure 65:
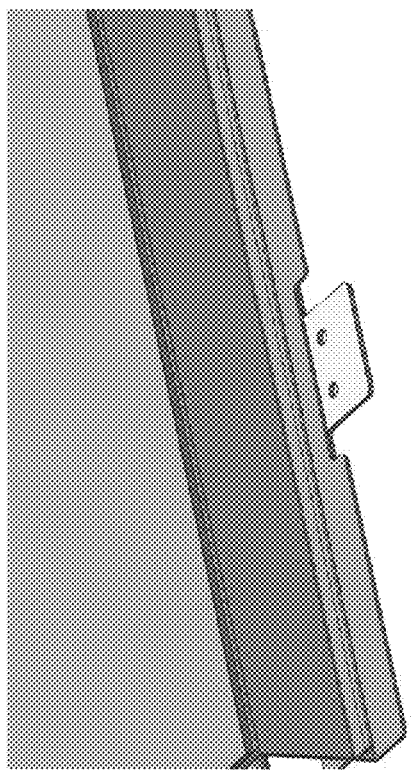
Figure 67:
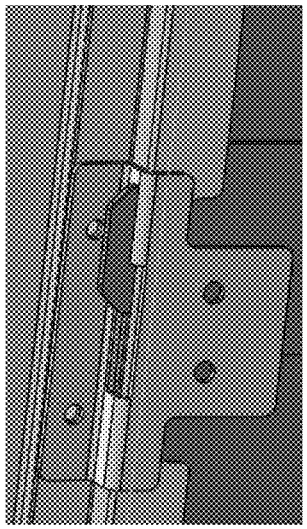
Figure 69:
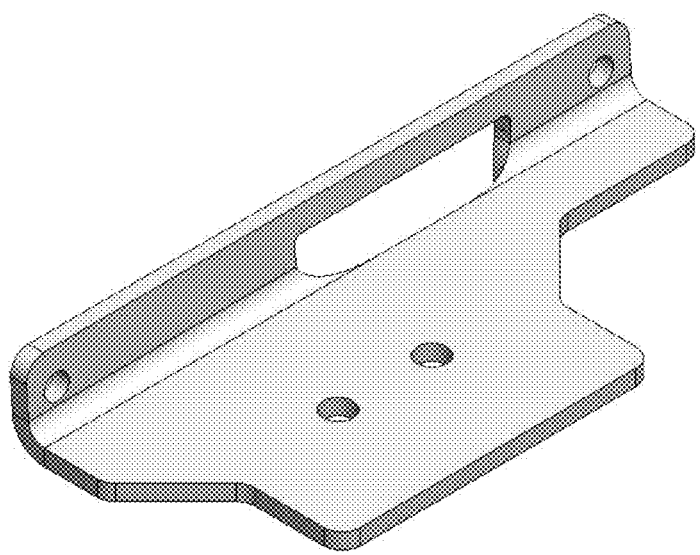
Figure 70:
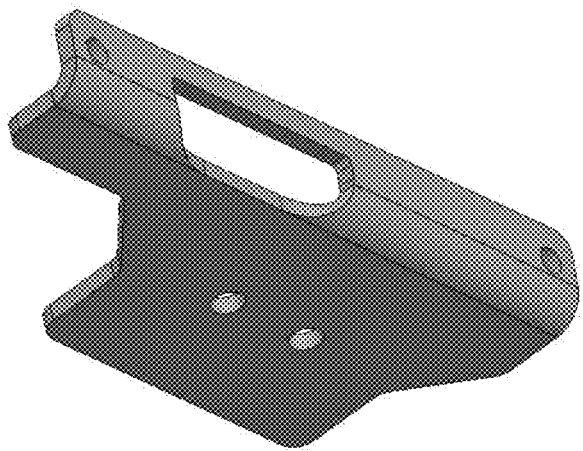
Figure 71:
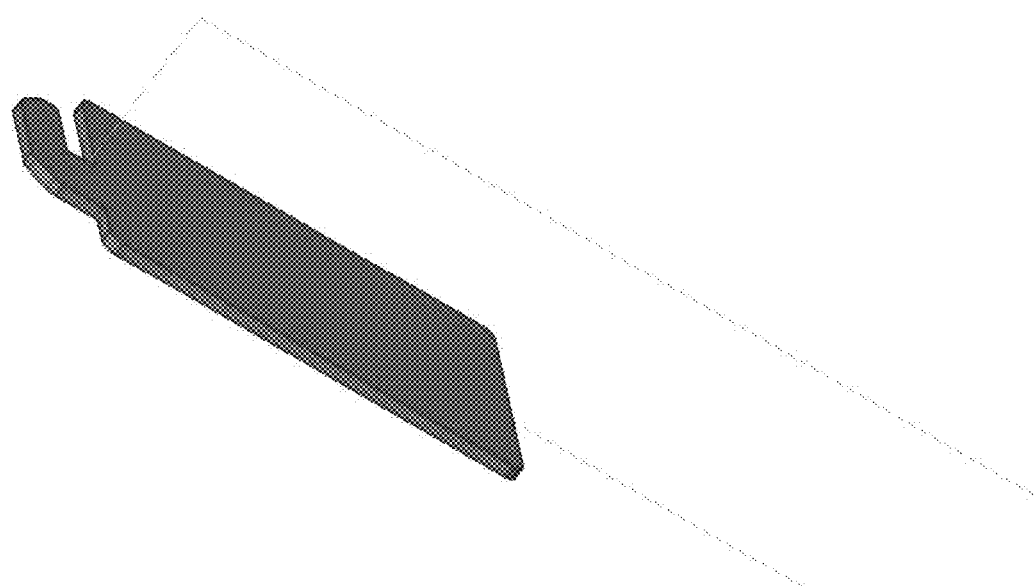
Figure 72:
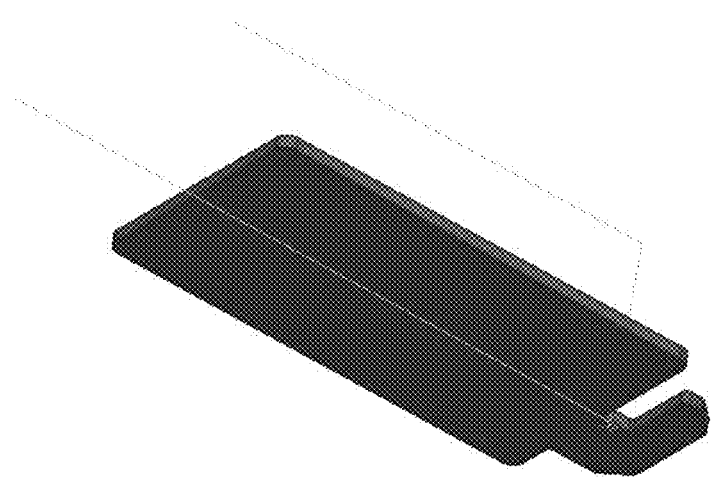
Figure 73:
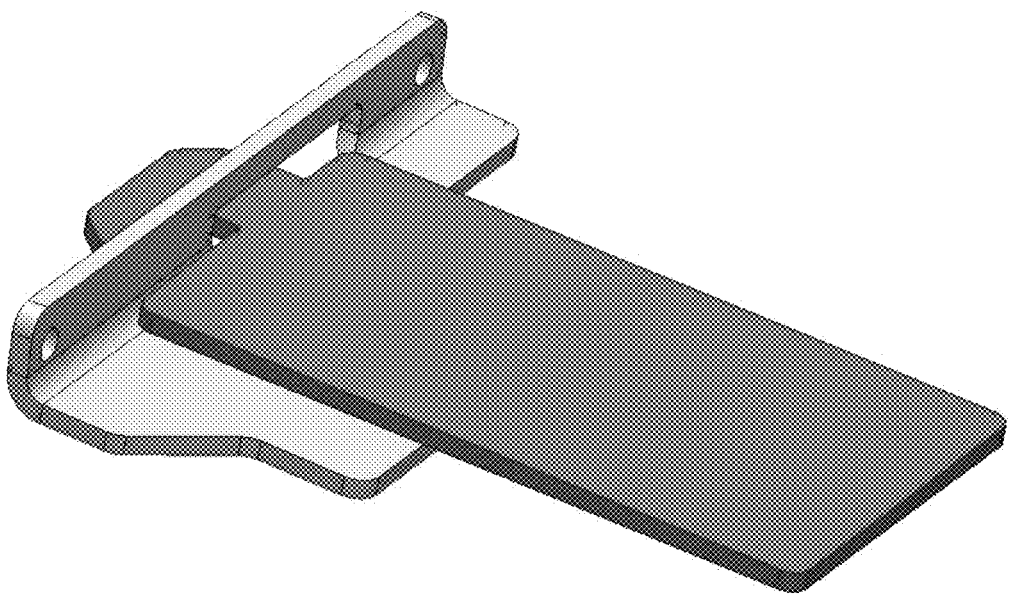
Figure 74:
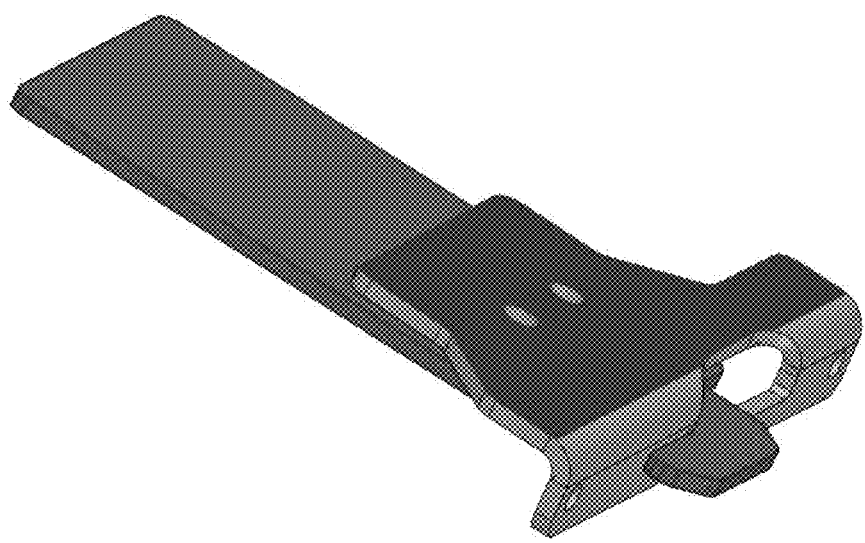
Figure 75:
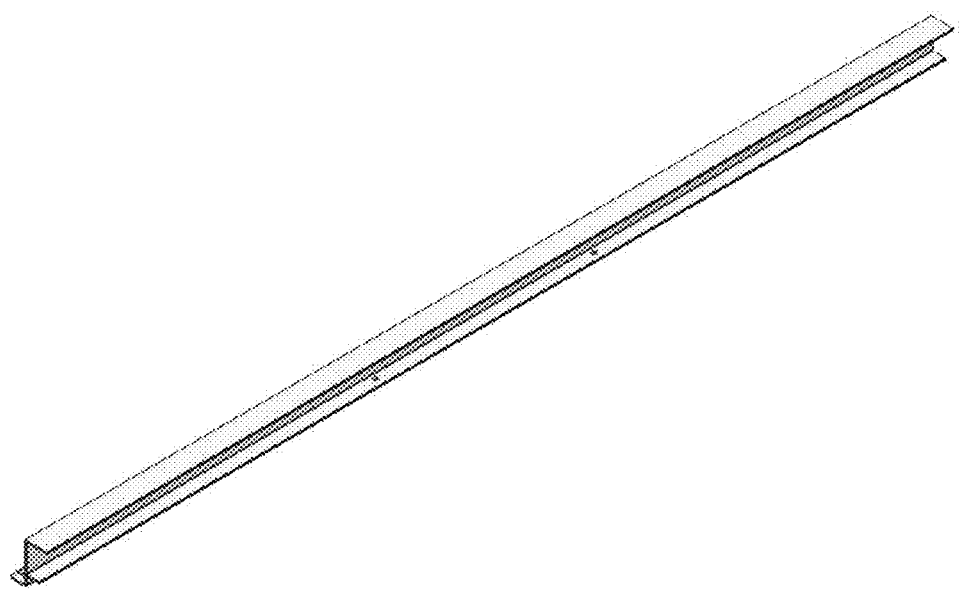

Turning to block 1470, and as shown in FIGS. 12A-12D, the mounting hooks 18 of a second folding PV panel 10 be slotted and retained by the front mounting foot 36 of a first folding PV panel. An example of two front to rear mounted folding PV panels is shown in FIG. 38.

Figure 15:
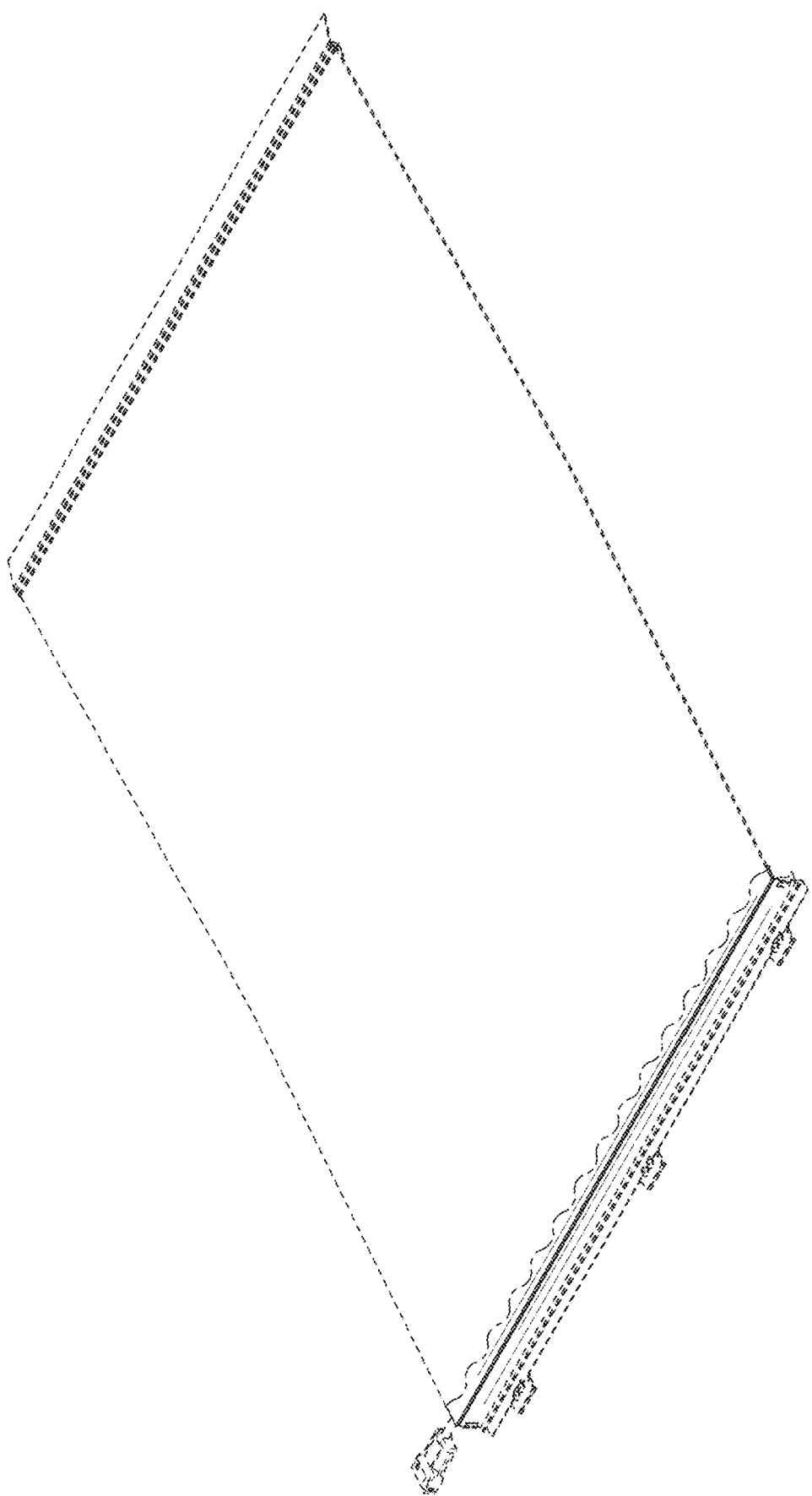
FIGS. 15-76 illustrate various embodiments and/or components of the PV panel systems and devices shown in FIGS. 1-13, in accordance with embodiments of the present disclosure.
Figure 16:
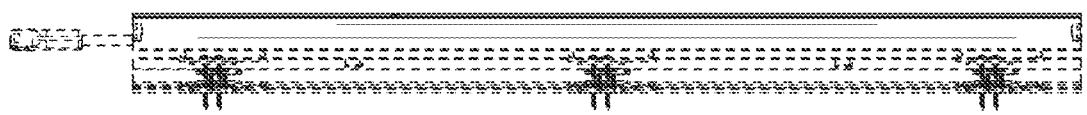
Figure 17:
Figure 18:
Figure 19:
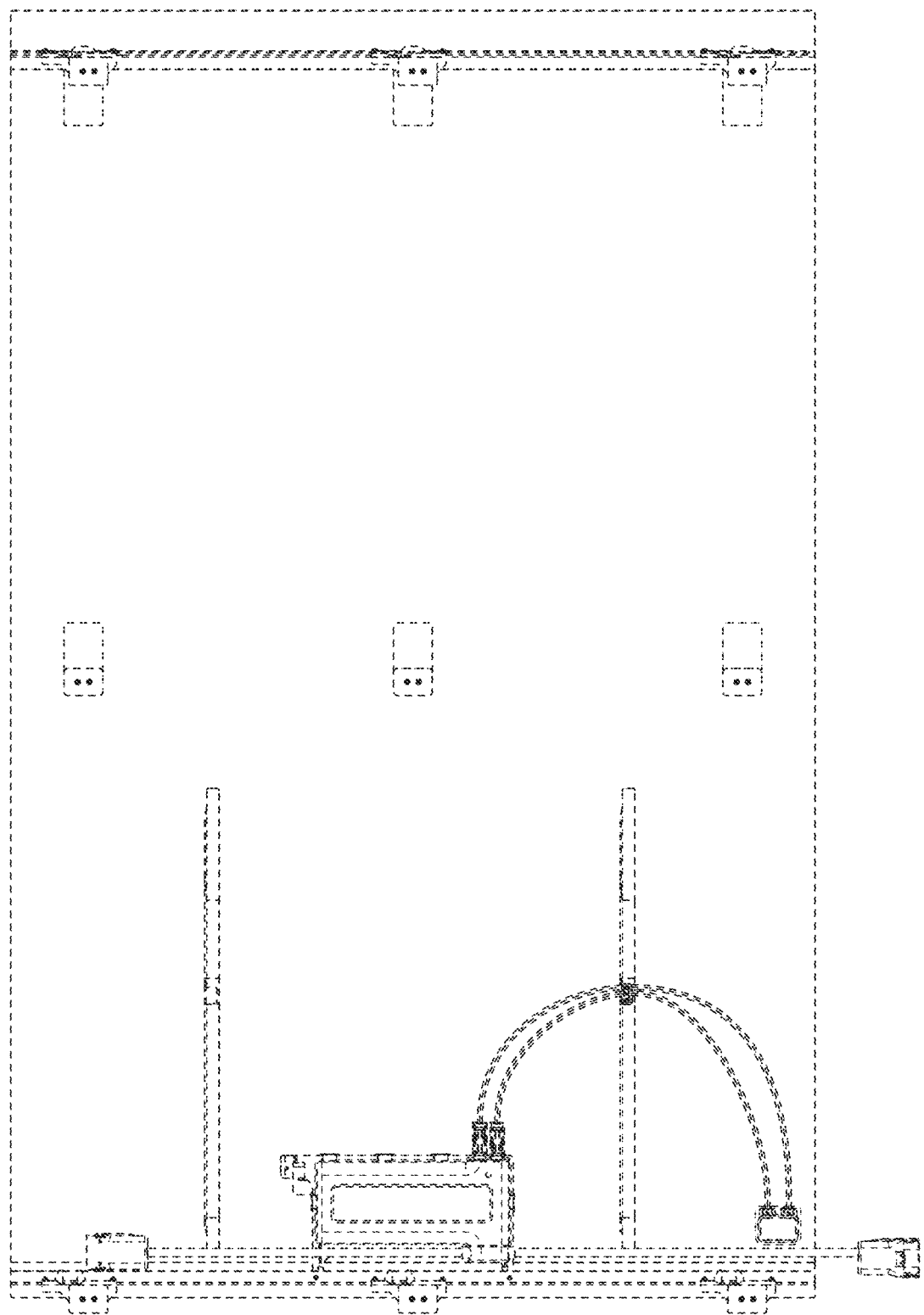
Figure 20:
Figure 21:
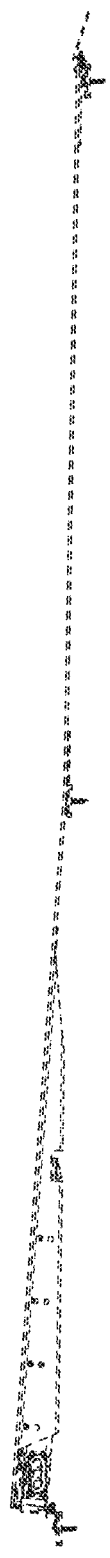
Figure 22:
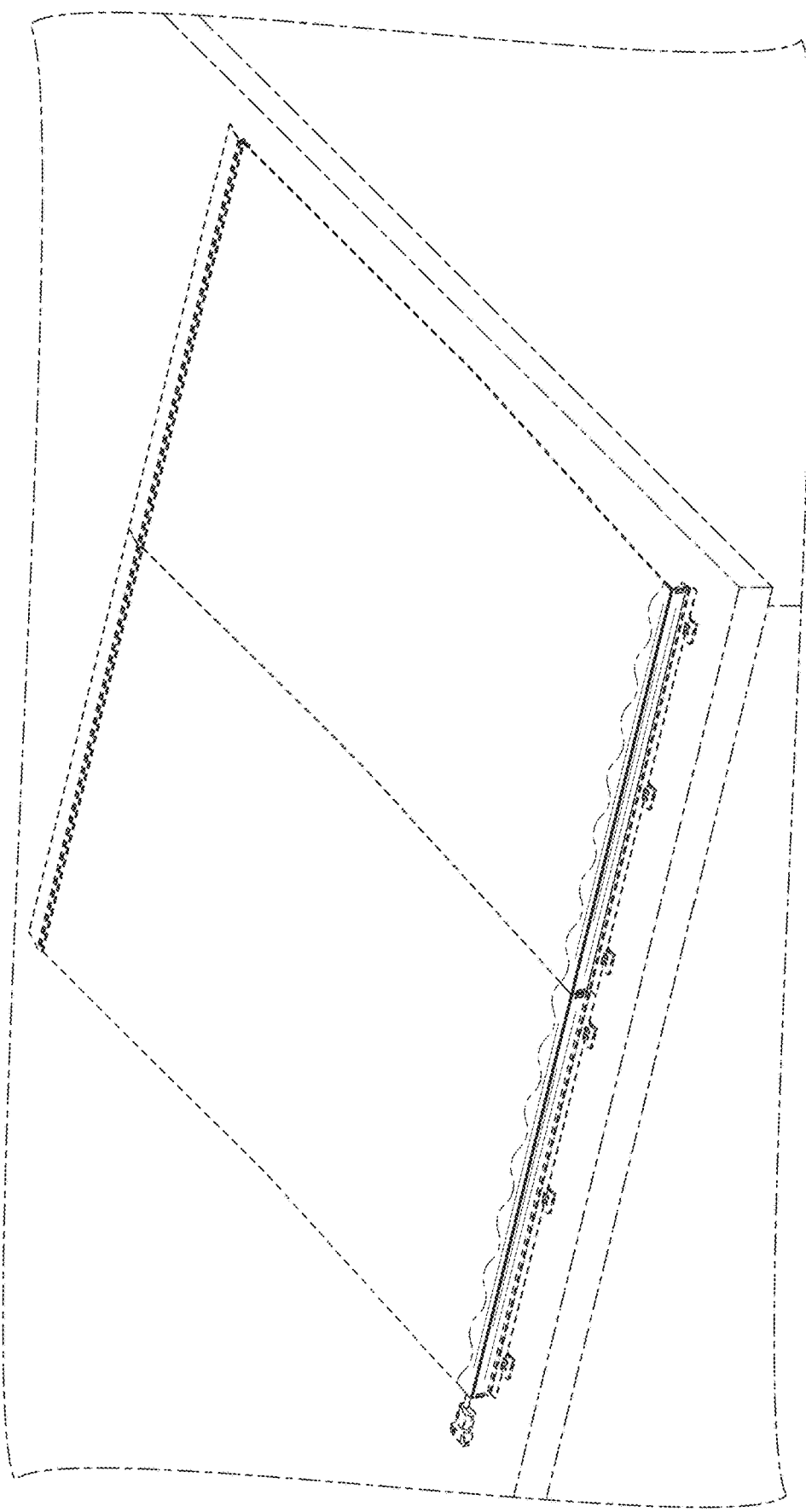
Figure 23:
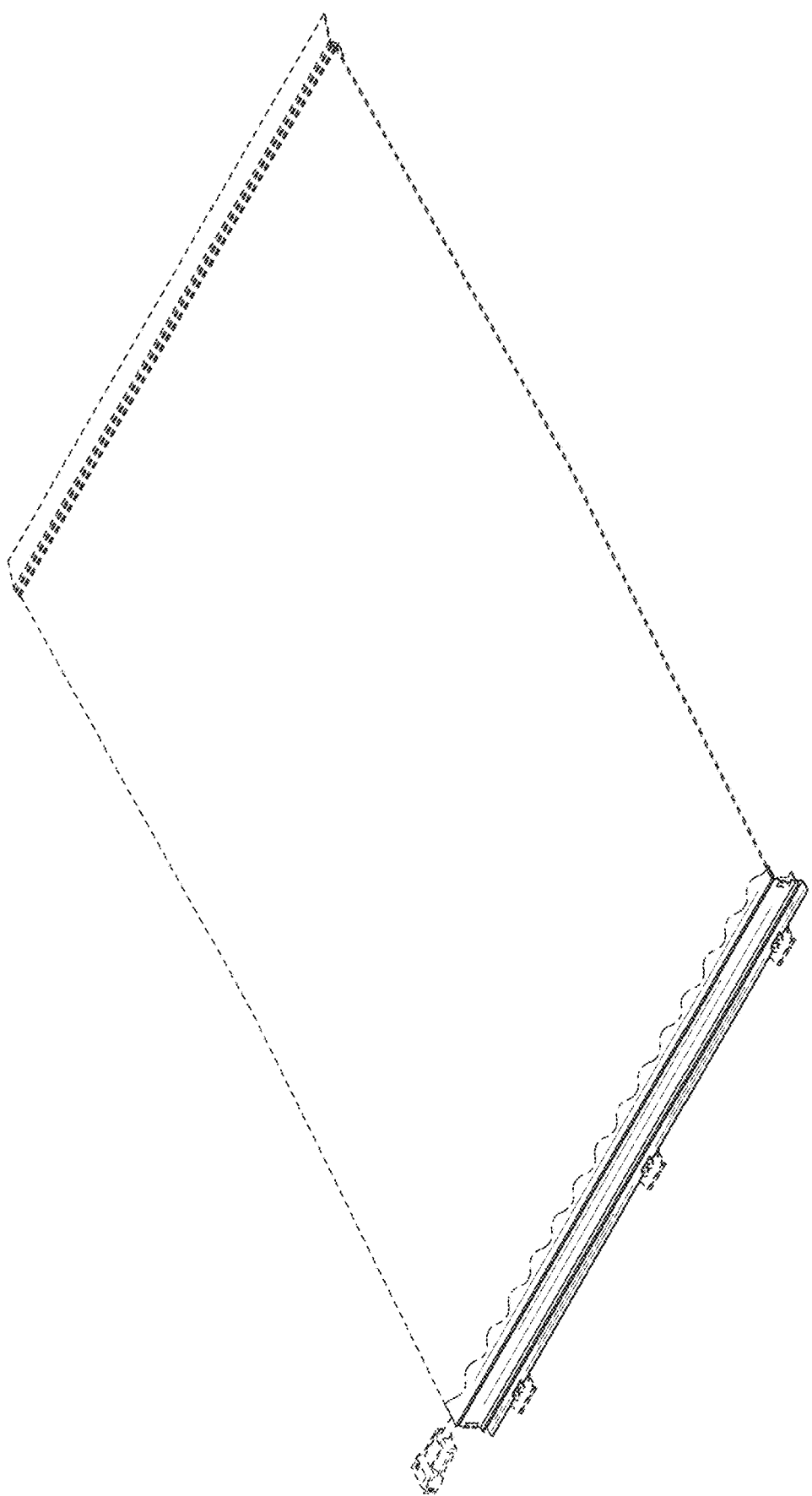
Figure 24:
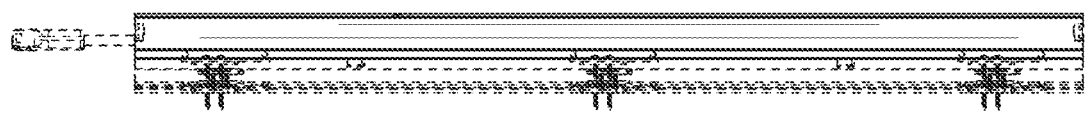
Figure 25:
Figure 26:
Figure 27:
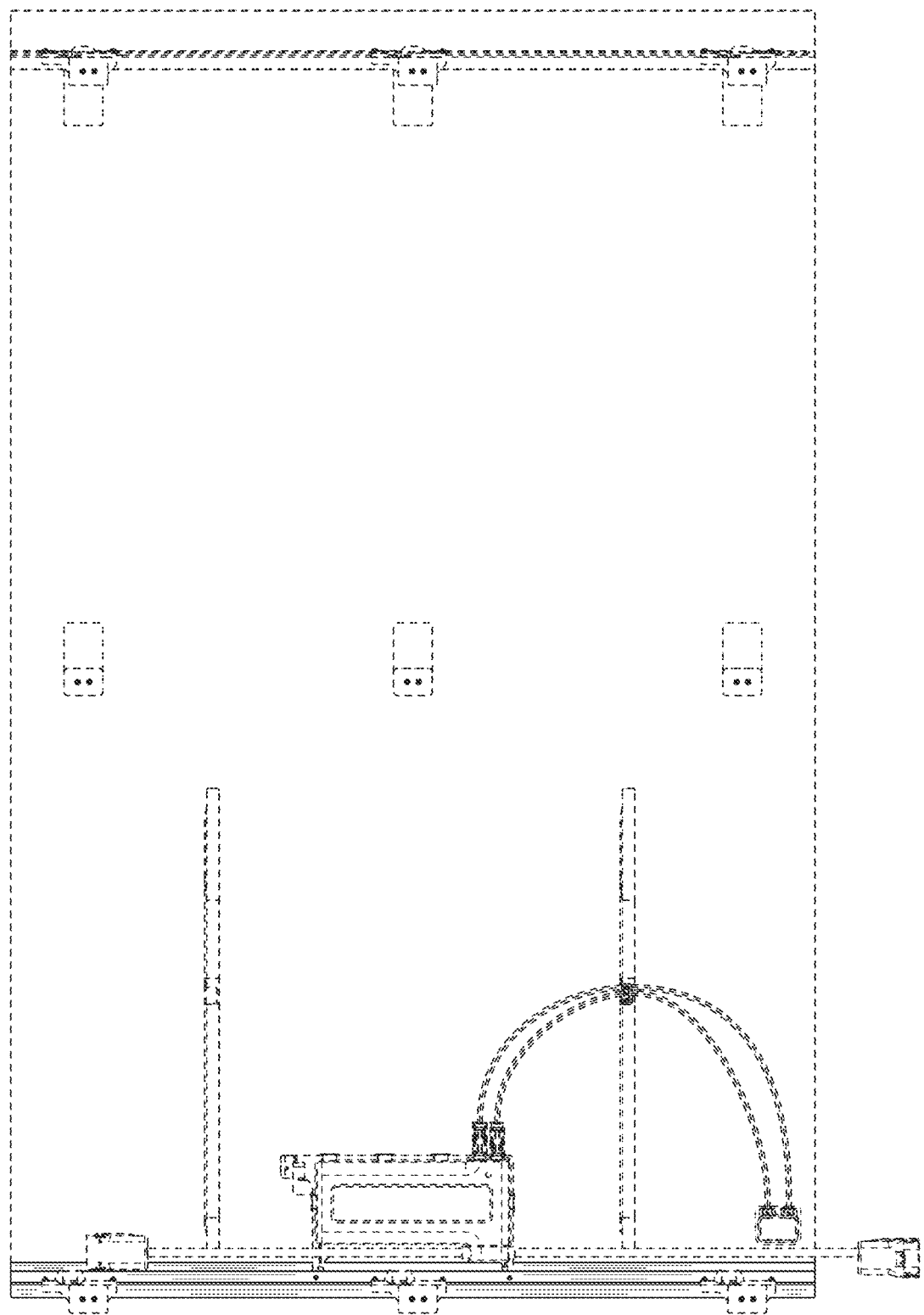
Figure 28:
Figure 29:
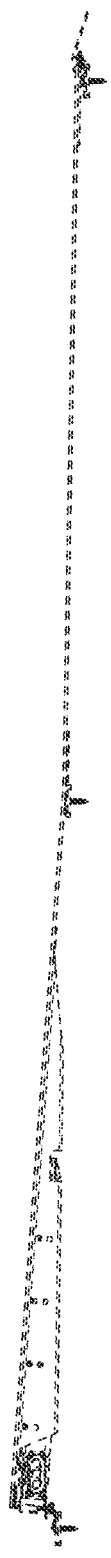
Figure 30:
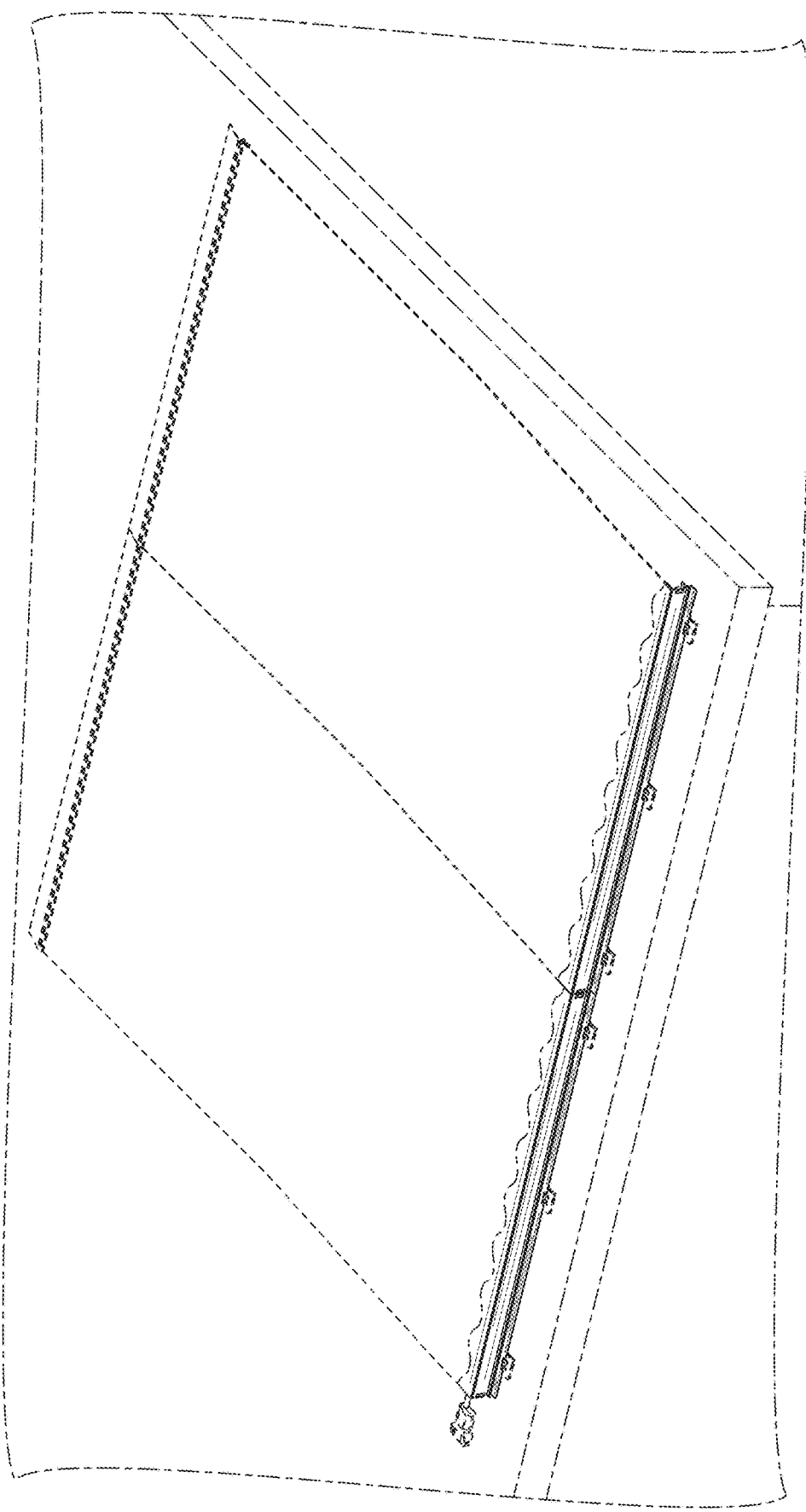
Figure 31:
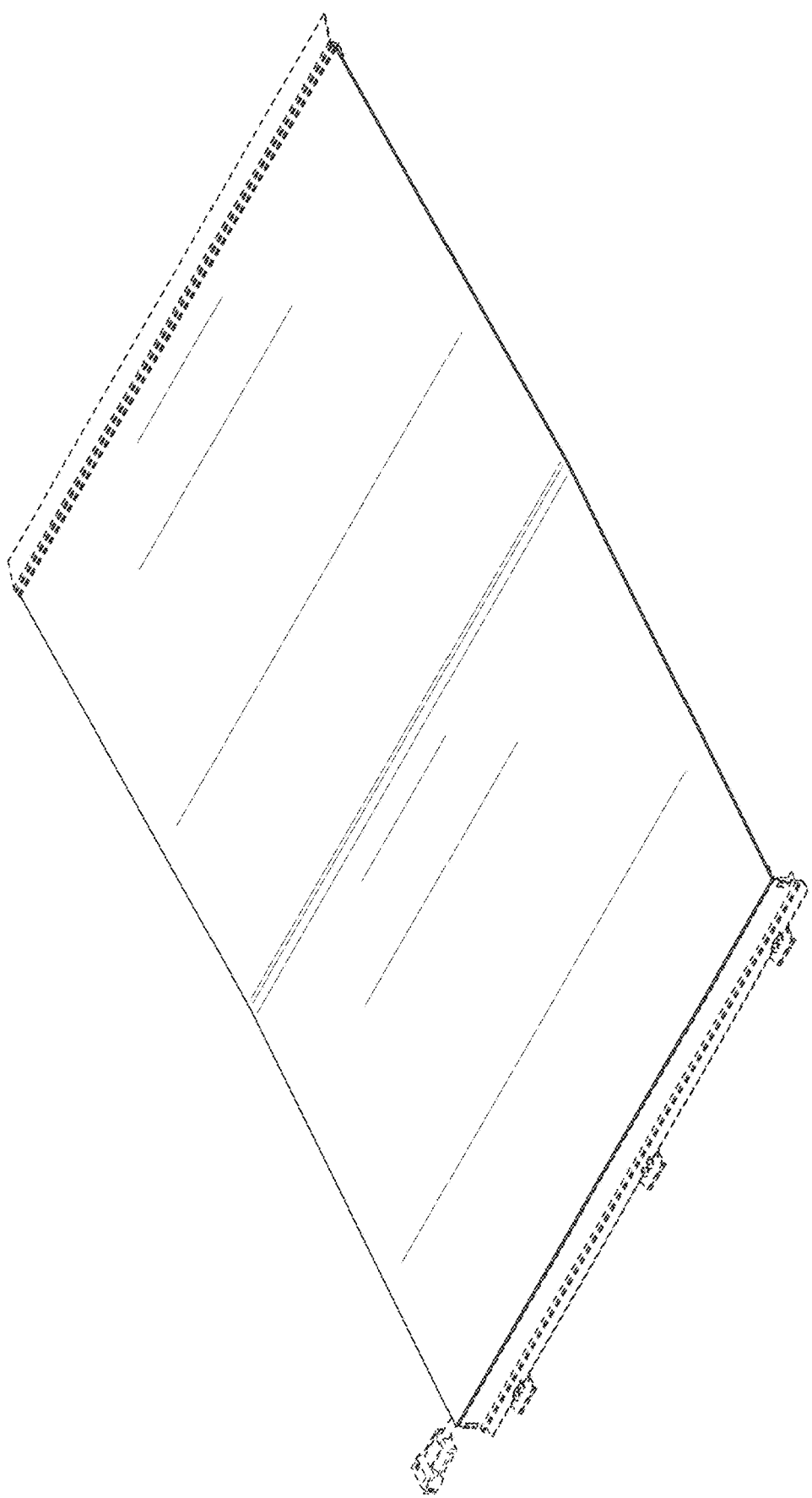
Figure 32:
Figure 33:
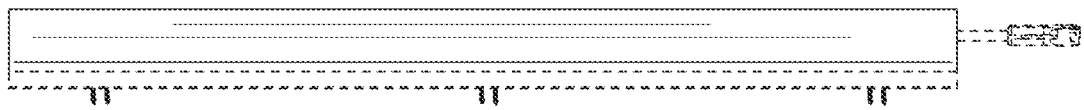
Figure 34:
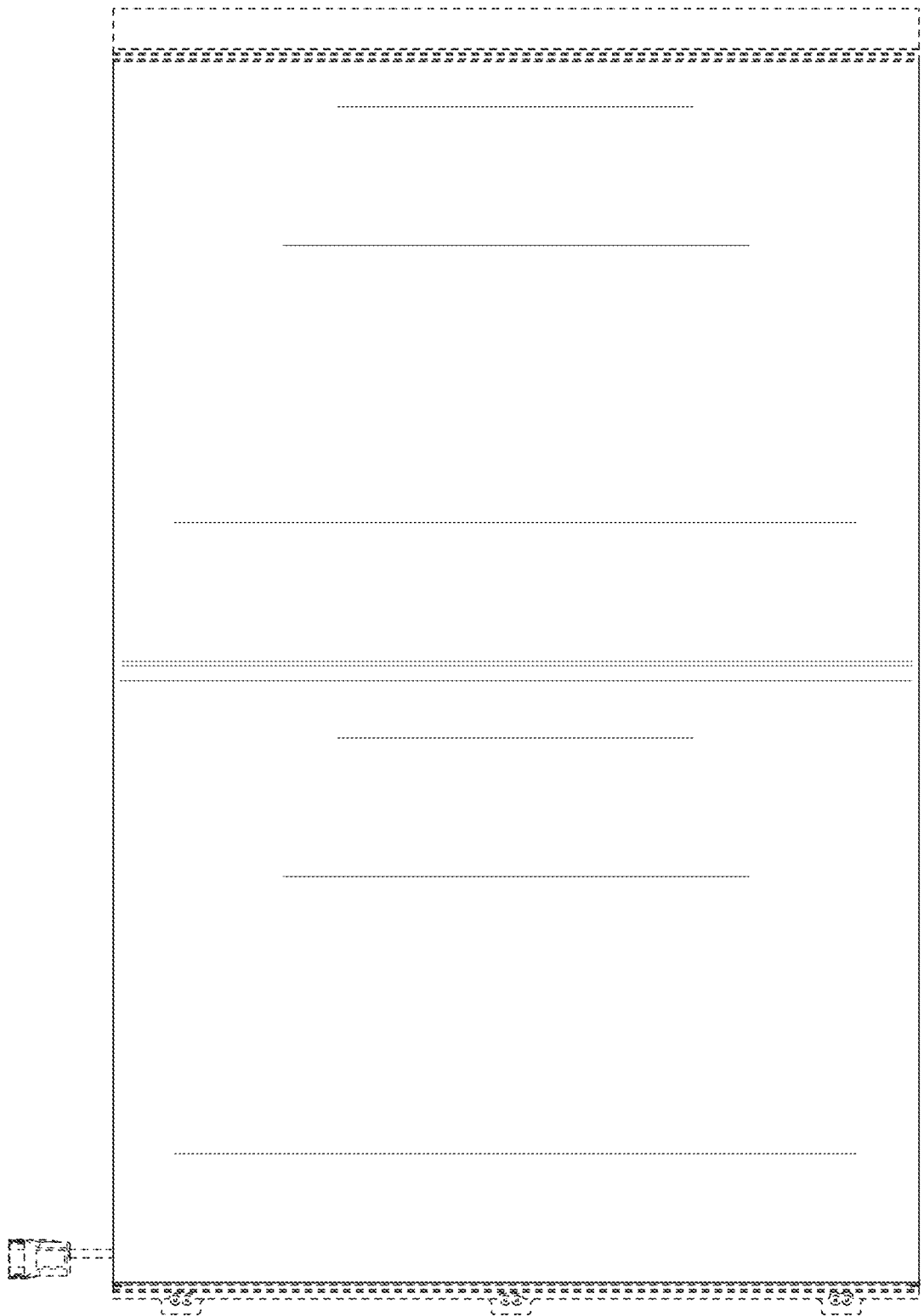
Figure 35:
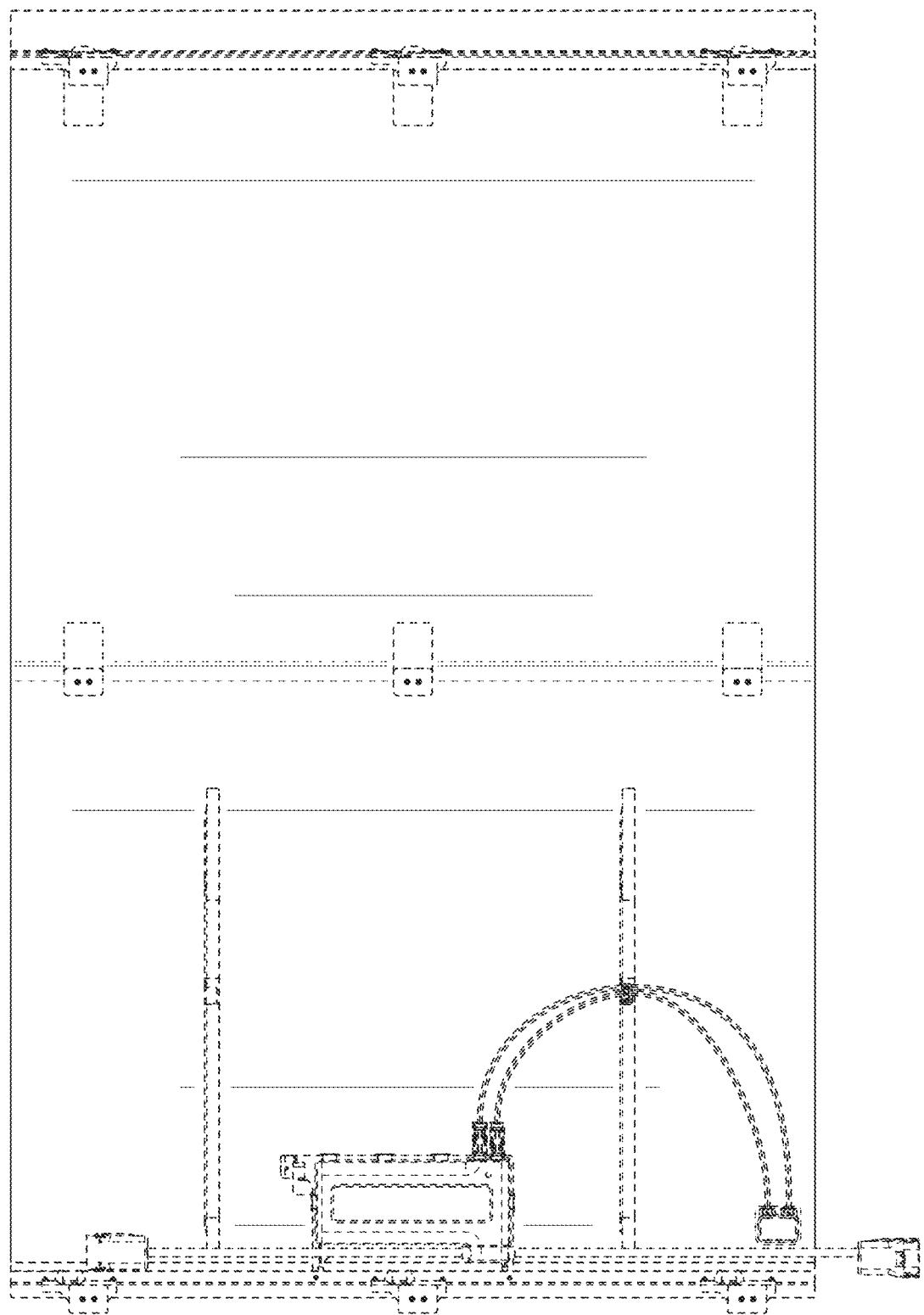
Figure 36:
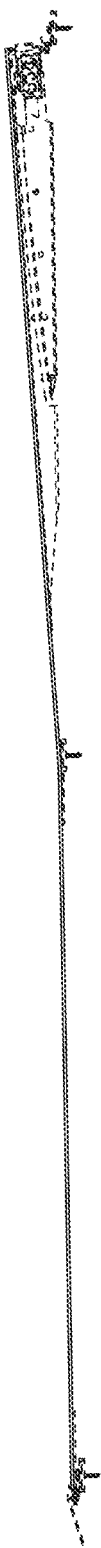
Figure 37:
Figure 76:
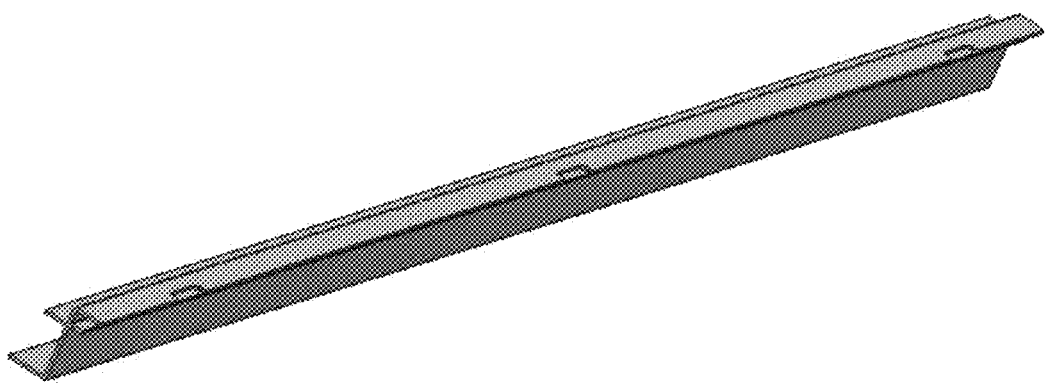

FIGS. 15-76 illustrate various embodiments, details, and/or components of the PV panel systems and devices disclosed herein.

In addition to the advantages described above, the folding PV panel having several subpanels interconnected by a hinge can satisfy other key product requirements. For example, the folding PV panel may be fire compliant, may have a lifetime that supports a 10 year warranty, and may be easily and quickly mounted on the roof.

EXAMPLES

Example A1 is a modular photovoltaic (PV) panel system, comprising:
a mounting flashing that is configured to be mounted to a mounting surface; and
a first folding PV panel, comprising:
a first subpanel including first PV cells, wherein the first subpanel extends along a first lateral plane and comprises a plurality of mounting hooks extending laterally from and affixed to a backside of the first subpanel, the mounting hooks configured to couple to the mounting flashing;
a second subpanel including second PV cells, wherein the second subpanel extends along a second lateral plane, wherein the second subpanel comprises a front edge support configured to hold a front edge of the second subpanel away from the mounting surface; and
a hinge assembly rotationally coupling the first subpanel and the second subpanel to allow an angle between the first lateral plane and the second lateral plane to change.

Example A2 includes the subject matter of example A1, or any other example herein, wherein the mounting flashing comprises a plurality of rear mounting feet having a slot, and wherein the plurality of mounting hooks are configured to engage with the slot of the rear mounting feet.

Example A3 includes the subject matter of example A2, or any other example herein, wherein the rear mounting feet each comprise a base plate portion.

Example A4 includes the subject matter of example A3, or any other example herein, wherein the rear mounting feet each further comprise a deformable mounting pad positioned between at least a portion of the base plate portion and the mounting surface when mounted.

Example A5 includes the subject matter of example A3, or any other example herein, wherein the rear mounting feet each further comprises an upper mounting flange portion configured to mount to the mounting flashing.

Example A6 includes the subject matter of example A1, or any other example herein, wherein the first subpanel further comprises:
a plurality of central mounting tabs extending laterally from and affixed to the backside of the first subpanel, the central mounting tabs configured to be mounted to the mounting surface, wherein the central mounting tabs are visible when the folding PV panel is a folded position, and wherein the central mounting tabs are covered by the hinge and/or second subpanel when the folding PV panel is in an extended, unfolded position.

Example A7 includes the subject matter of example A6, or any other example herein, wherein the central mounting tabs comprise a deformable mounting pad positioned between at least a portion of the central mounting tabs and the mounting surface when mounted.

Example A8 includes the subject matter of example A1, or any other example herein, wherein the second subpanel further comprises a plurality of spacing and/or stiffening elements, configured to prevent the second subpanel from sagging.

Example A9 includes the subject matter of example A1, or any other example herein, wherein the front edge support comprises a plurality of front mounting feet each comprising a base plate portion and wherein the front mounting feet are configured to mount to the mounting surface.

Example A10 includes the subject matter of example A9, or any other example herein, wherein the front mounting feet each further comprise a deformable mounting pad positioned between at least a portion of the base plate portion and the mounting surface when mounted.

Example A11 includes the subject matter of example A10, or any other example herein, wherein the front mounting feet each further comprise and a slot for mounting hooks from a second folding PV panel.

Example A12 includes the subject matter of example A9, or any other example herein, wherein the front mounting feet further comprise an upper mounting flange portion configured to mount to the mounting flashing.

Example A13 includes the subject matter of example A1, or any other example herein, wherein the second subpanel comprises a power converter and/or a junction box mounted on the backside of the second subpanel.

Example A14 includes the subject matter of example A13, or any other example herein, wherein the power converter is mounted to the backside of the second subpanel with a tab that spaces the power converter away from the backside of the second subpanel to form an air gap.

Example A15 includes the subject matter of example A13, or any other example herein, wherein the front edge support comprises heat and electrically conductive material and wherein the front edge support is configured as heat sink and a ground and the power converter is further mounted to the front edge support.

Example A16 includes the subject matter of example A1, or any other example herein, further comprising a front flashing coupleable to the front edge support.

Example A17 includes the subject matter of example A1, or any other example herein, further comprising a left end cover and a right end cover each coupleable to the second subpanel.

Example A18 includes the subject matter of example A1, or any other example herein, further comprising at least one additional folding PV panel.

Example B1 is a method of mounting a set of photovoltaic (PV) panels to a surface, comprising:

mounting a mounting flashing to the surface; and
coupling a first folding PV panel to the mounting flashing, wherein the first folding PV panel comprises:
a first folding PV panel, comprising:
a first subpanel including first PV cells, wherein the first subpanel extends along a first lateral plane and comprises a plurality of mounting hooks extending laterally from and affixed to a backside of the first subpanel, the mounting hooks configured to couple to the mounting flashing;
a second subpanel including second PV cells, wherein the second subpanel extends along a second lateral plane, wherein the second subpanel comprises a front edge support configured to hold a front edge of the second subpanel away from the mounting surface; and
a hinge assembly rotationally coupling the first subpanel and the second subpanel to allow an angle between the first lateral plane and the second lateral plane to change.

Example B2 includes the subject matter of example B1, or any other example herein, wherein the mounting flashing comprises a plurality of rear mounting feet having a slot, and wherein the plurality of mounting hooks are configured to engage with the slot of the rear mounting feet.

Example B3 includes the subject matter of example B2, or any other example herein, wherein the rear mounting feet each comprise a base plate portion.

Example B4 includes the subject matter of example B3, or any other example herein, wherein the rear mounting feet each further comprise a deformable mounting pad positioned between at least a portion of the base plate portion and the mounting surface when mounted.

Example B5 includes the subject matter of example B3, or any other example herein, wherein the rear mounting feet further comprise an upper mounting flange portion configured to mount to the mounting flashing.

Example B6 includes the subject matter of example B1, or any other example herein, wherein the first subpanel further comprises:

a plurality of central mounting tabs extending laterally from and affixed to the backside of the first subpanel, the central mounting tabs configured to be mounted to the mounting surface, wherein the central mounting tabs are visible when the folding PV panel is a folded position, and wherein the central mounting tabs are covered by the hinge and/or second subpanel when the folding PV panel is in an extended, unfolded position.

Example B7 includes the subject matter of example B6, or any other example herein, wherein the central mounting tabs comprise a deformable mounting pad positioned between at least a portion of the central mounting tabs and the mounting surface when mounted.

Example B8 includes the subject matter of example B1, or any other example herein, wherein the second subpanel further comprises a plurality of spacing and/or stiffening elements, configured to prevent the second subpanel from sagging.

Example B9 includes the subject matter of example B1, or any other example herein, wherein the front edge support comprises a plurality of front mounting feet each comprising a base plate portion and wherein the front mounting feet are configured to mount to the mounting surface.

Example B10 includes the subject matter of example B9, or any other example herein, wherein the front mounting feet each further comprise a deformable mounting pad positioned between at least a portion of the base plate portion and the mounting surface when mounted.

Example B11 includes the subject matter of example B10, or any other example herein, wherein the front mounting feet each further comprise a slot for mounting hooks from a second folding PV panel.

Example B12 includes the subject matter of example B9, or any other example herein, wherein the front mounting feet further comprise an upper mounting flange portion configured to mount to the mounting flashing.

Example B13 includes the subject matter of example B1, wherein the second subpanel comprises a power converter and/or a junction box mounted on the backside of the second subpanel.

Example B14 includes the subject matter of example B13, or any other example herein, wherein the power converter is mounted to the backside of the second subpanel with a tab that spaces the power converter away from the backside of the second subpanel to form an air gap.

Example B15 includes the subject matter of example B14, or any other example herein, wherein the front edge support comprises heat and electrically conductive material and wherein the front edge support is configured as heat sink and a ground and the power converter is further mounted to the front edge support.

Example B16 includes the subject matter of example B1, or any other example herein, further comprising a front flashing coupleable to the front edge support.

Example B17 includes the subject matter of example B1, or any other example herein, further comprising a left end cover and a right end cover each coupleable to the second PV panel.

Example B18 includes the subject matter of example B1, or any other example herein, further comprising at least one additional folding PV panel.

Example B19 includes the subject matter of example B1, or any other example herein, wherein the first subpanel further comprises:

a plurality of central mounting tabs extending laterally from and affixed to the backside of the first subpanel, the central mounting tabs, configured to be mounted to the mounting surface, wherein the central mounting tabs are visible when the folding PV panel is a folded position, and wherein the central mounting tabs are covered by the hinge and/or second subpanel when the folding PV panel is in an extended, unfolded position, the method further comprising:
mounting the central mounting tabs to the surface.

Example B20 includes the subject matter of example B1, or any other example herein, wherein the front edge support comprises a plurality of front mounting feet each comprising a base plate portion and wherein the front mounting feet are configured to mount to the mounting surface, the method further comprising:
mounting the front mounting feet to the surface.

Example B21 includes the subject matter of example B20, or any other example herein, wherein the front mounting feet each further comprise a slot for mounting hooks from a second folding PV panel.

Example B22 includes the subject matter of example B21, further comprising mounting the second folding PV panel to the front mounting feet of the first folding panel.

Example C1 is a modular folding photovoltaic (PV) panel, comprising:

a first subpanel including first PV cells, wherein the first subpanel extends along a first lateral plane and comprises a plurality of mounting hooks extending laterally from and affixed to a backside of the first subpanel, the mounting hooks configured to couple to the mounting flashing;

a second subpanel including second PV cells, wherein the second subpanel extends along a second lateral plane, wherein the second subpanel comprises a front edge support configured to hold a front edge of the second subpanel away from the mounting surface; and a hinge assembly rotationally coupling the first subpanel and the second subpanel to allow an angle between the first lateral plane and the second lateral plane to change.

Example C2 includes the subject matter of example C1, or any other example herein, wherein the mounting flashing comprises a plurality of rear mounting feet having a slot, and wherein the plurality of mounting hooks are configured to engage with the slot of the rear mounting feet.

Example C3 includes the subject matter of example C2, or any other example herein, wherein the rear mounting feet each comprise a base plate portion.

Example C4 includes the subject matter of example C3, or any other example herein, wherein the rear mounting feet each further comprise a deformable mounting pad positioned between at least a portion of the base plate portion and the mounting surface when mounted.

Example C5 includes the subject matter of example C3, or any other example herein, wherein the rear mounting feet further comprise an upper mounting flange portion configured to mount to the mounting flashing.

Example C6 includes the subject matter of example C1, or any other example herein, wherein the first subpanel further comprises:

a plurality of central mounting tabs extending laterally from and affixed to the backside of the first subpanel, the central mounting tabs configured to be mounted to the mounting surface, wherein the central mounting tabs are visible when the folding PV panel is a folded position, and wherein the central mounting tabs are covered by the hinge and/or second subpanel when the folding PV panel is in an extended, unfolded position.

Example C7 includes the subject matter of example C6, or any other example herein, wherein the central mounting tabs comprise a deformable mounting pad positioned between at least a portion of the central mounting tabs and the mounting surface when mounted.

Example C8 includes the subject matter of example C1, or any other example herein, wherein the second subpanel further comprises a plurality of spacing and/or stiffening elements, configured to prevent the second subpanel from sagging.

Example C9 includes the subject matter of example C1, or any other example herein, wherein the front edge support comprises a plurality of front mounting feet each comprising a base plate portion and wherein the front mounting feet are configured to mount to the mounting surface.

Example C10 includes the subject matter of example C9, or any other example herein, wherein the front mounting feet each further comprise a deformable mounting pad positioned between at least a portion of the base plate portion and the mounting surface when mounted.

Example C11 includes the subject matter of example C10, or any other example herein, wherein the front mounting feet each further comprise and a slot for mounting hooks from a second folding PV panel.

Example C12 includes the subject matter of example C9, wherein the front mounting feet further comprise an upper mounting flange portion configured to mount to the mounting flashing.

Example C13 includes the subject matter of example C1, or any other example herein, wherein the second subpanel comprises power converter and/or a junction box mounted on the backside of the second subpanel.

Example C14 includes the subject matter of example C13, or any other example herein, wherein the power converter is mounted to the backside of the second subpanel with a tab that spaces the power converter away from the backside of the second subpanel to form an air gap.

Example C15 includes the subject matter of example C14, or any other example herein, wherein the front edge support comprises heat and electrically conductive material and wherein the front edge support is configured as heat sink and a ground and the power converter is further mounted to the front edge support.

Example A1 is a modular photovoltaic (PV) panel system, comprising:

a mounting flashing that is configured to be mounted to a mounting surface; and a PV panel, comprising PV cells;

a plurality of mounting hooks extending laterally from and affixed to a backside of the PV panel, the mounting hooks configured to couple to the mounting flashing; and a front edge support configured to hold a front edge of the PV panel away from the mounting surface.

Example D2 includes the subject matter of example D1, or any other example herein, wherein the mounting flashing comprises a plurality of rear mounting feet having a slot, and wherein the plurality of mounting hooks are configured to engage with the slot of the rear mounting feet.

Example D3 includes the subject matter of example D2, or any other example herein, wherein the rear mounting feet each comprise a base plate portion.

Example D3 includes the subject matter of example D2, or any other example herein, wherein the rear mounting feet each further comprise a deformable mounting pad positioned between at least a portion of the base plate portion and the mounting surface when mounted.

Example D4 includes the subject matter of example D2, or any other example herein, wherein the rear mounting feet further comprises an upper mounting flange portion configured to mount to the mounting flashing.

Example D5 includes the subject matter of example D1, or any other example herein, 1, wherein the PV panel further comprises a plurality of spacing and/or stiffening elements, configured to prevent the second subpanel from sagging.

Example D6 includes the subject matter of example D1, or any other example herein, wherein the front edge support comprises a plurality of front mounting feet each comprising a base plate portion and wherein the front mounting feet are configured to mount to the mounting surface.

Example D7 includes the subject matter of example D6, or any other example herein, wherein the front mounting feet each further comprise a deformable mounting pad positioned between at least a portion of the base plate portion and the mounting surface when mounted.

Example D8 includes the subject matter of example D6, or any other example herein, wherein the front mounting feet each further comprise and a slot for mounting hooks from a second PV panel.

Example D9 includes the subject matter of example D6, or any other example herein, wherein the front mounting feet further comprises an upper mounting flange portion configured to mount to the mounting flashing.

Example D10 includes the subject matter of example D1, or any other example herein, wherein the second subpanel comprises power converter and/or a junction box mounted on the backside of the PV panel.

Example D11 includes the subject matter of example D10, or any other example herein, wherein power converter is mounted to the backside of the PV panel with a tab that spaces the power converter away from the backside of the panel to form an air gap.

Example D12 includes the subject matter of example D10, or any other example herein, wherein the front edge support comprises heat and electrically conductive material and wherein the front edge support is configured as heat sink and a ground and the power converter is further mounted to the front edge support.

Example D13 includes the subject matter of example D1, or any other example herein, further comprising a front flashing coupleable to the front edge support.

Example D14 includes the subject matter of example D1, or any other example herein, further comprising a left end cover and a right end cover each coupleable to the PV panel.

Example D15 includes the subject matter of example D1, or any other example herein, further comprising at least one additional PV panel.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A modular photovoltaic (PV) panel system, comprising: a first folding PV panel, comprising:
    a first subpanel including first PV cells, wherein the first subpanel extends along a first lateral plane, wherein the first subpanel is substantially flat against a mounting surface;
    a second subpanel including second PV cells, wherein the second subpanel extends along a second lateral plane different than the first lateral plane,
    wherein the second subpanel comprises a front edge support configured to hold a front edge of the second subpanel away from the mounting surface in an unfolded mounting position, and wherein the second subpanel is angled relative to the first subpanel to form a tapered space under the second subpanel; and
    a hinge assembly rotationally coupling the first subpanel and the second subpanel to allow an angle between the first lateral plane and the second lateral plane to change.

2. The modular PV panel system of claim 1, wherein the first folding PV panel further comprises one or more accessory components mounted on the second subpanel.

3. The modular PV panel system of claim 2, wherein the one or more accessory components are mounted on a backside of the second subpanel in a space between the backside of the second subpanel and the mounting surface.

4. The modular PV panel system of claim 2, wherein the one or more accessory components include a power converter and/or a junction box.

5. The modular PV panel system of claim 4, wherein the power converter is mounted to the backside of the second subpanel with a tab that spaces the power converter away from the backside of the second subpanel to form an air gap.

6. The modular PV panel system of claim 2, wherein an accessory component includes an electrical cable for transferring electrical power generated by the PV cells.

7. The modular PV panel system of claim 1, wherein the second subpanel further comprises a plurality of spacing and/or stiffening elements, configured to prevent the second subpanel from sagging.

8. The modular PV panel system of claim 1, wherein the front edge support comprises heat and electrically conductive material and wherein the front edge support is configured as a heat sink and an electrical ground to the mounting surface.

9. The modular PV panel system of claim 1, wherein the front edge support comprises a plurality of front mounting feet configured to mount to the mounting surface.

10. The modular PV panel system of claim 9, wherein the front mounting feet each comprise a deformable mounting pad positioned between at least a portion of each mounting feet and the mounting surface when mounted.

11. The modular PV panel system of claim 1, wherein the front edge support comprises an engagement feature attaching the first folding PV panel to a compatible engagement feature of a first subpanel of a second folding PV panel.

12. The modular PV panel system of claim 11, wherein the engagement feature comprises a hook and the compatible engagement feature comprises a slot.

13. The modular PV panel system of claim 1, further comprising a front flashing coupleable to the front edge support.

14. The modular PV panel system of claim 1, further comprising a left end cover and a right end cover each coupleable to the second subpanel.

15. A modular photovoltaic (PV) panel comprising:
    a first PV subpanel extending along a first lateral plane, wherein the first subpanel is substantially flat against a mounting surface;
    a second PV subpanel extending along a second lateral plane, wherein the second subpanel is angled relative to the first subpanel to form a tapered space under the second subpanel,
    a joint between the first PV subpanel and the second PV subpanel to allow an angle between the first lateral plane and the second lateral plane to change between a folded position and an unfolded mounting position;
    a front edge support coupled to a front edge of the second PV subpanel;
    wherein in the unfolded mounting position, the front edge support holds the front edge of the second PV subpanel in a raised position above the mounting surface and the first PV subpanel extends in the first lateral plane substantially parallel to the mounting surface.

16. The modular PV system of claim 15, wherein the joint is flexible such that the first and second PV subpanels flex when mounted such that the first lateral plane of the first PV subpanel and the second lateral plane of the second PV subpanel are separated by an angle in the unfolded mounting position.

17. The modular PV panel system of claim 15, wherein a backside of the second subpanel and the mounting surface form at least a portion of a housing for one or more electrical components of the modular PV panel system.

18. The modular PV system of claim 15, wherein the front edge support comprises heat and electrically conductive material and is configured as a heat sink and an electrical ground to the mounting surface.

19. A modular photovoltaic (PV) array mounted on a mounting surface comprising:
- a first row comprising a first folding PV panel;
- a second row comprising second folding PV panel;

wherein the first and second folding PV panels each comprise:
- a first PV subpanel extending along a first lateral plane, wherein the first subpanel is substantially flat against the mounting surface;
- a second PV subpanel extending along a second lateral plane, wherein the second subpanel is angled relative to the first subpanel to form a tapered space under the second subpanel,
- a joint between the first PV subpanel and the second PV subpanel to allow an angle between the first lateral plane and the second lateral plane to change between a folded position and an unfolded mounting position;
- a front edge support coupled to a front edge of the second PV subpanel; wherein the front edge support holds the front edge of the second PV subpanel in a raised position above the mounting surface in the unfolded mounting position;
- wherein the front edge support of the first folding PV panel in the first row further comprises an feature to attach to a compatible feature of the first subpanel of the second folding PV panel in the second row.

20. The modular PV array of claim 19, wherein each folding PV panel comprises one or more accessory components mounted on the backside of the second subpanel in a space between the backside of the second subpanel and the mounting surface.

\* \* \* \* \*